May 5, 1970  J. D. HOLLINGSWORTH  3,510,381
APPARATUS AND METHOD FOR MAKING LAMINATED PANEL MEANS
Filed March 11, 1966  21 Sheets-Sheet 3
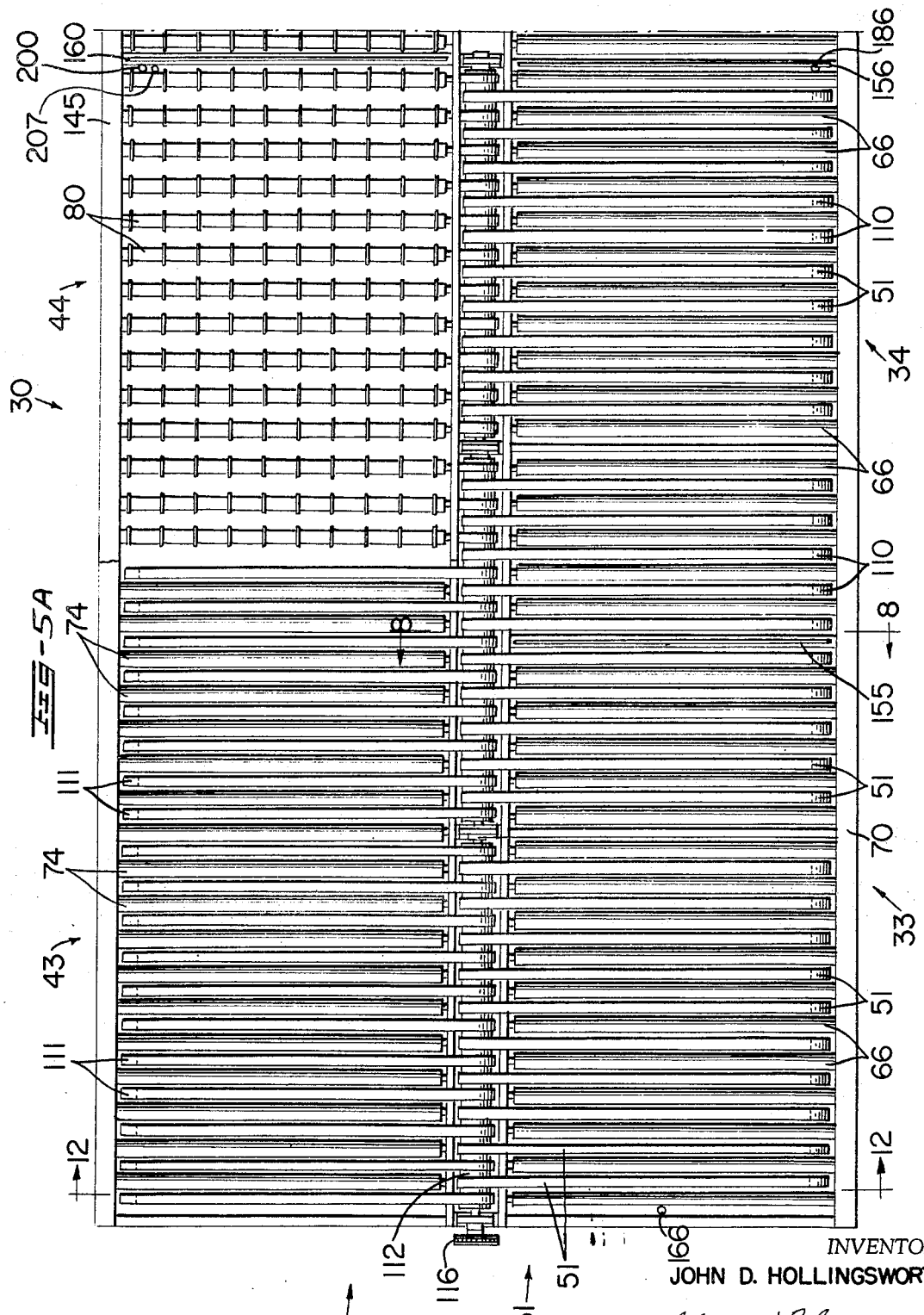
INVENTOR
JOHN D. HOLLINGSWORTH
BY Glenn, Palmer, Matthews & Lyne
HIS ATTORNEYS

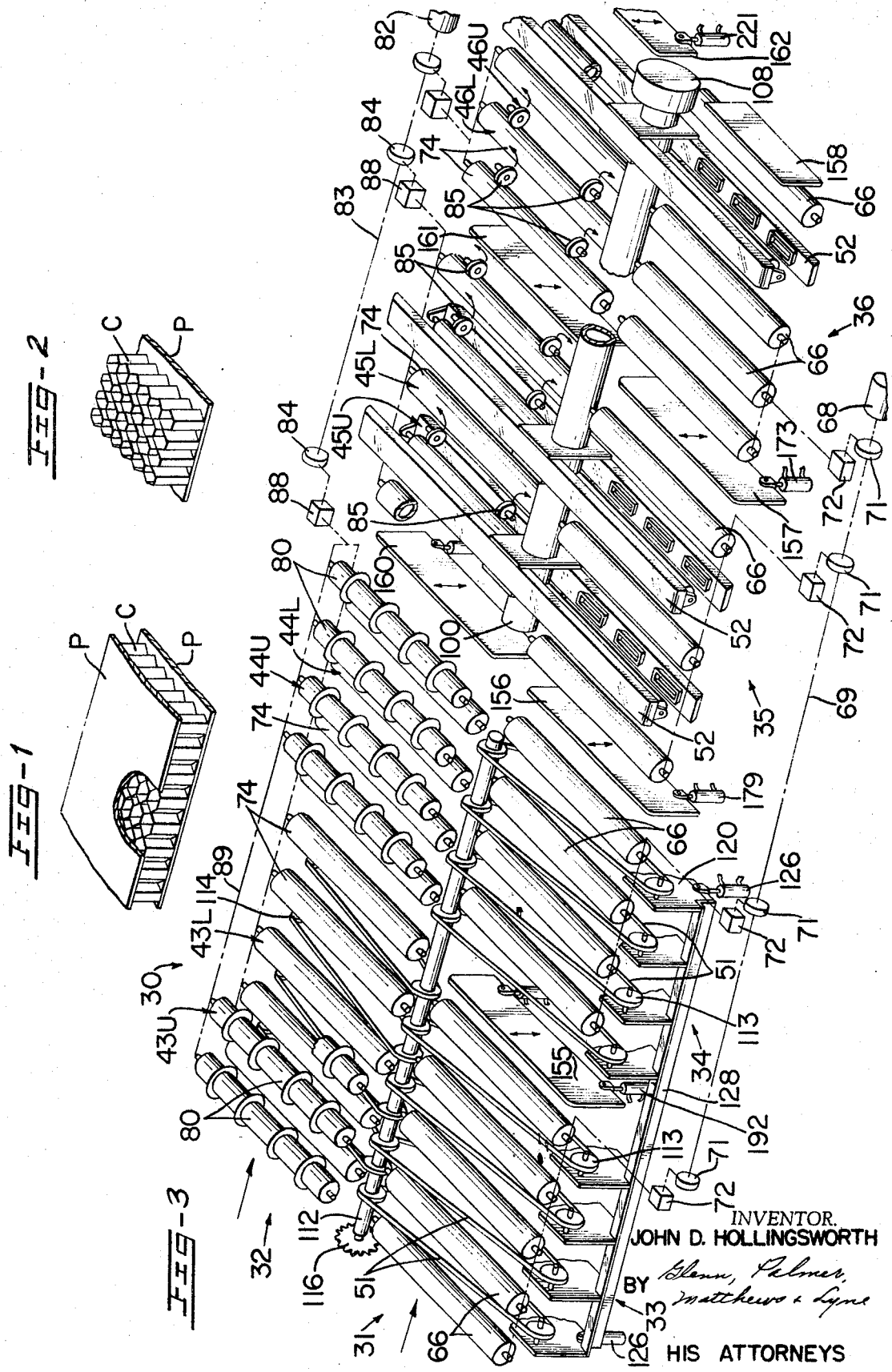

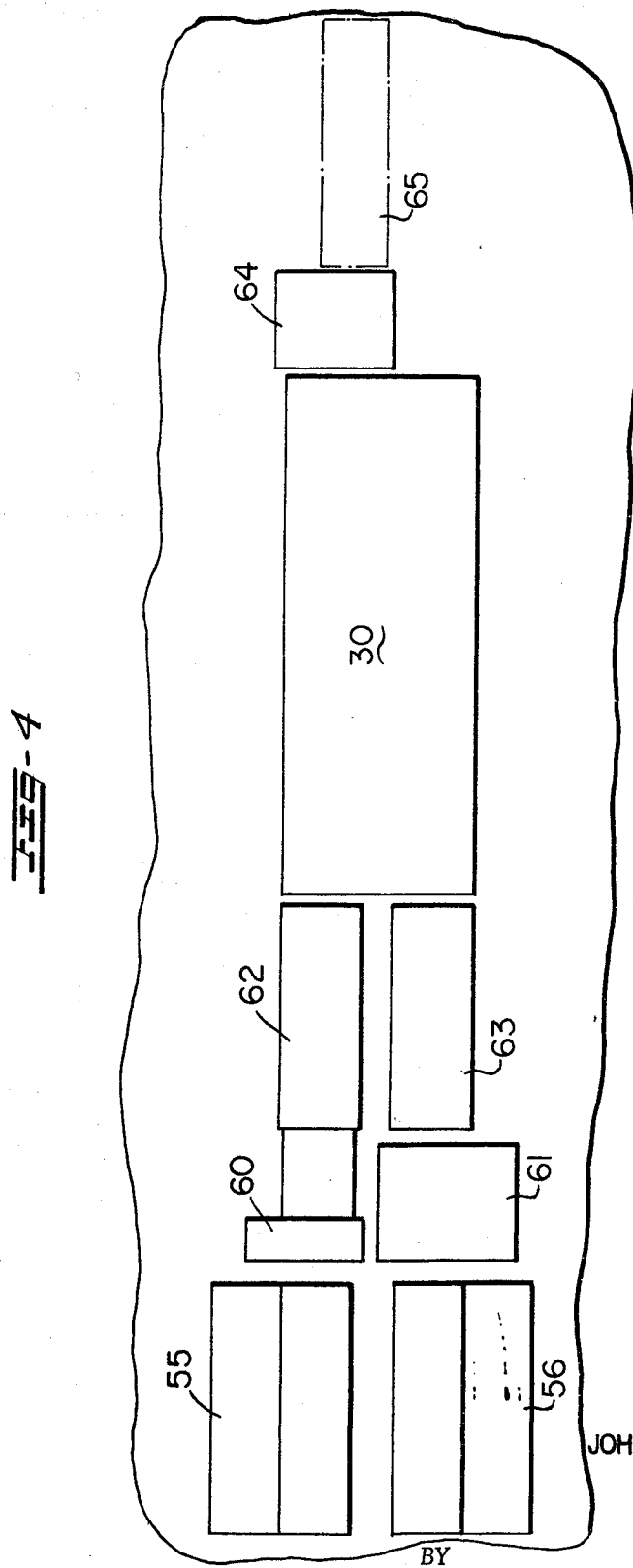

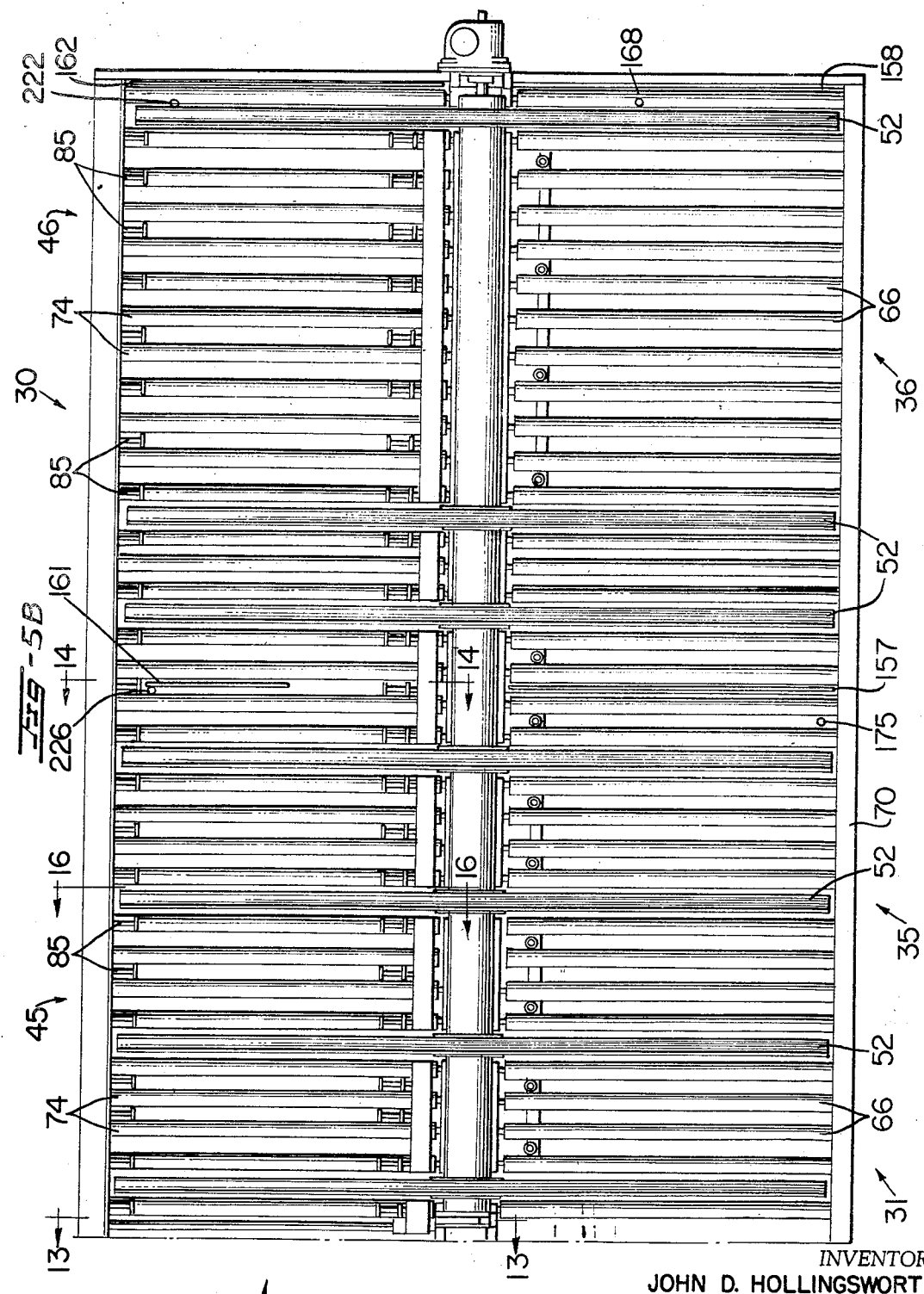

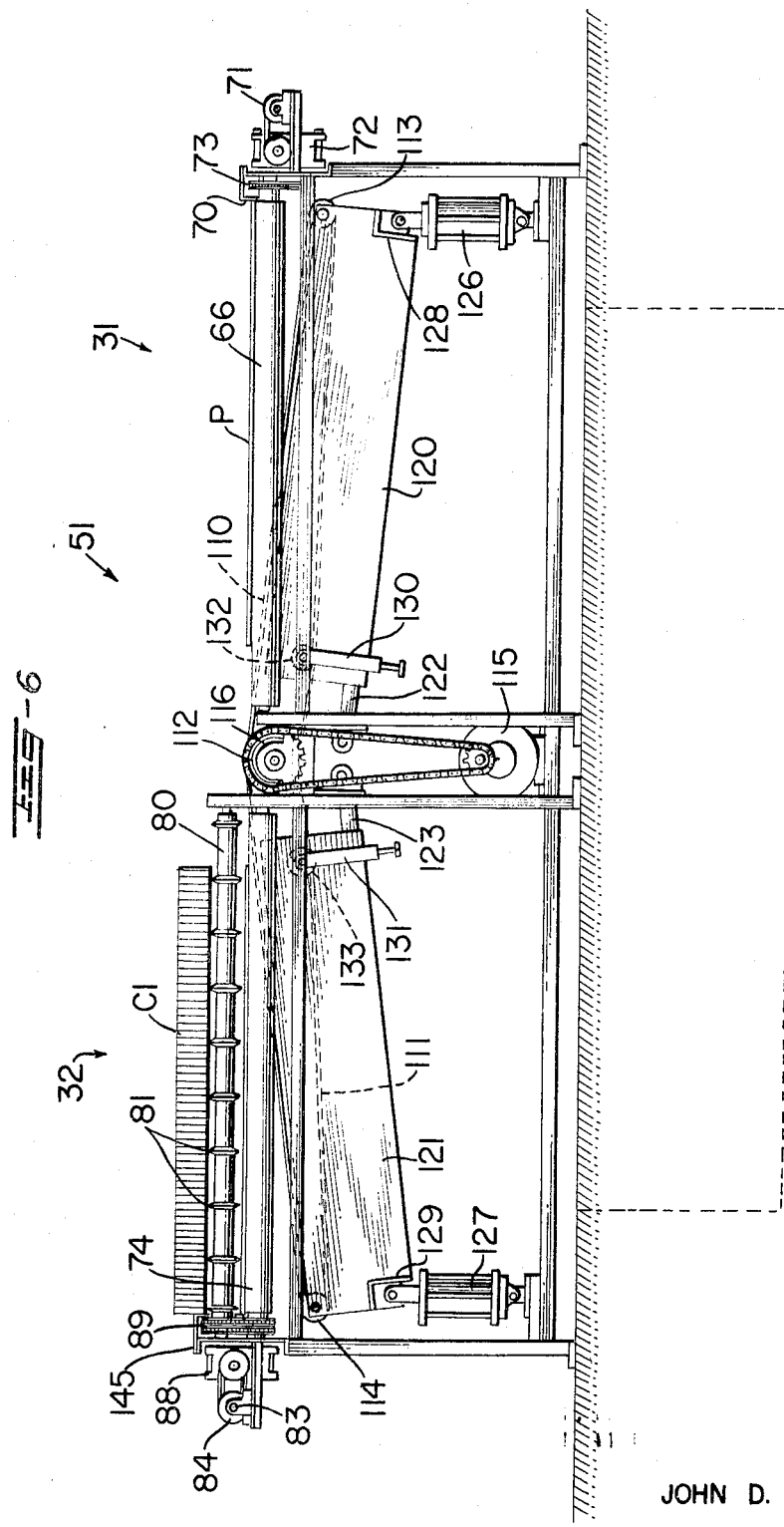

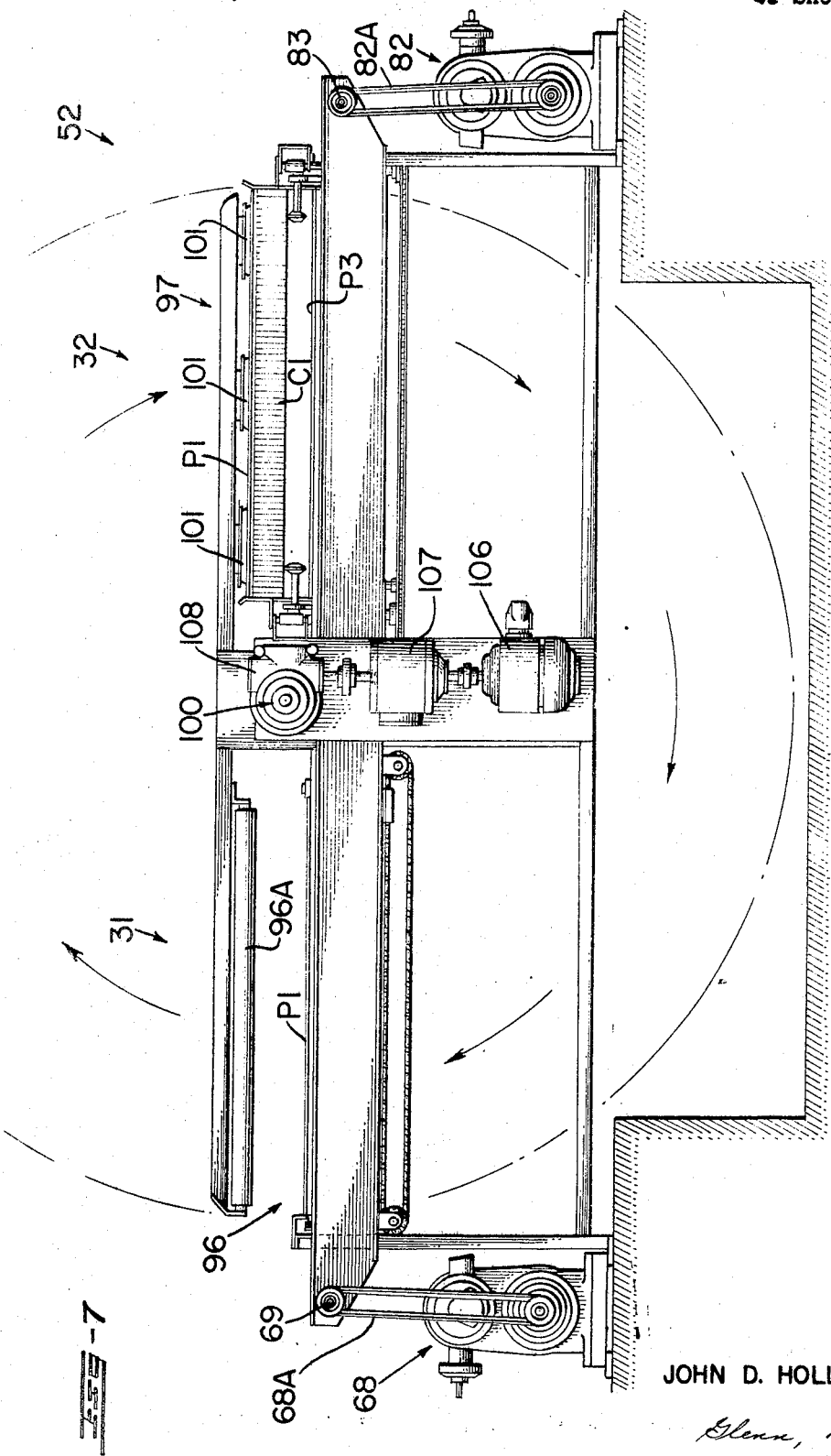

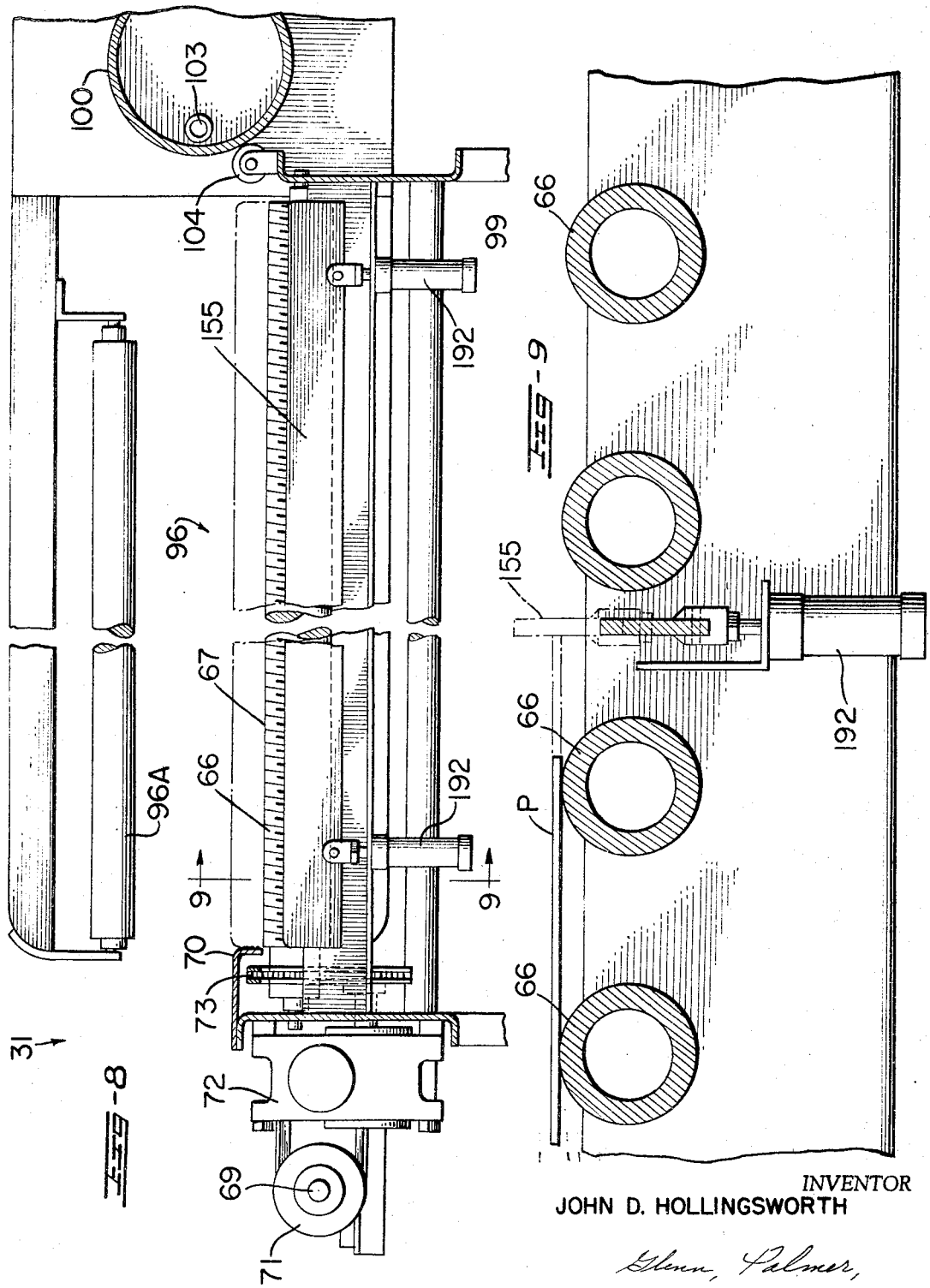

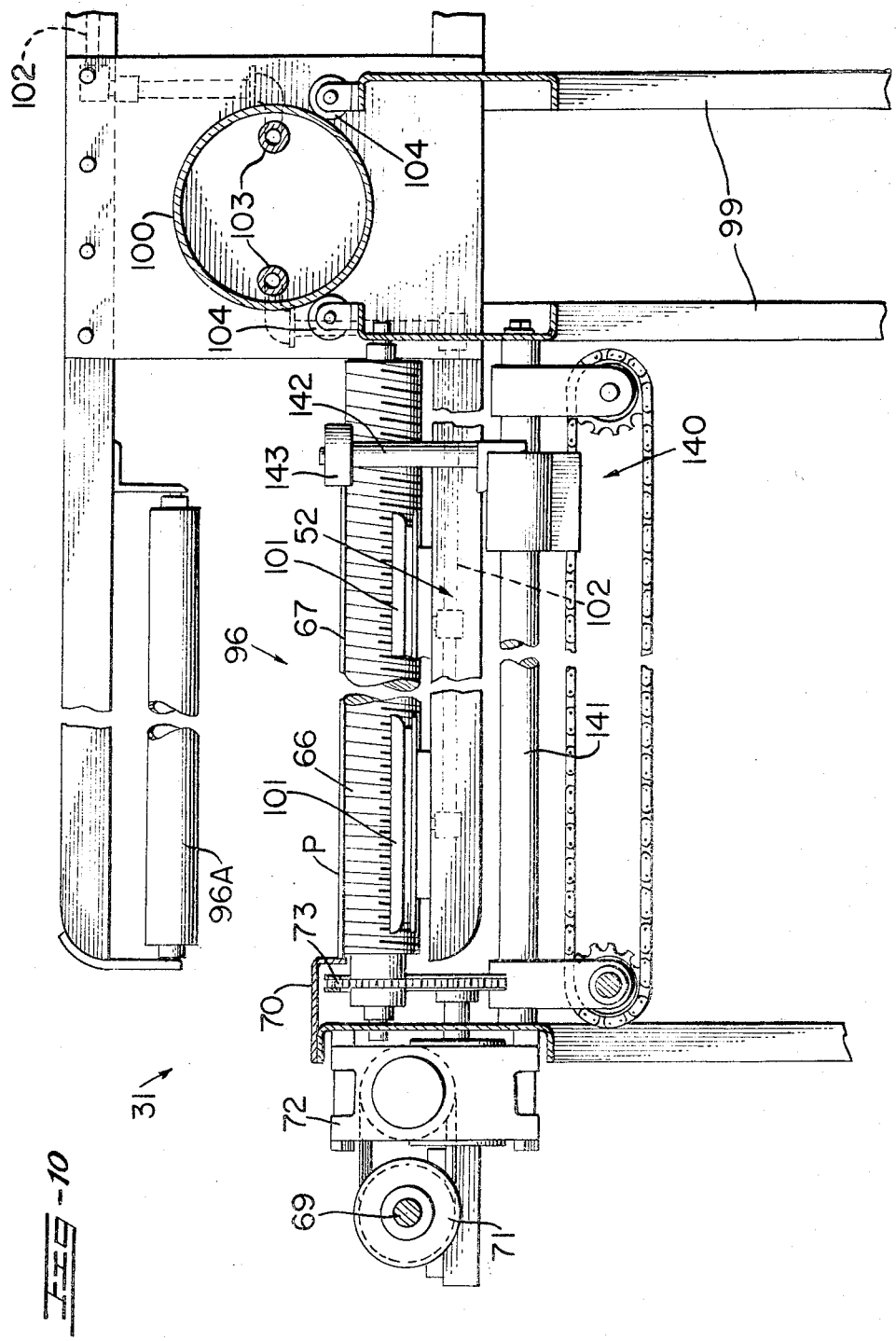

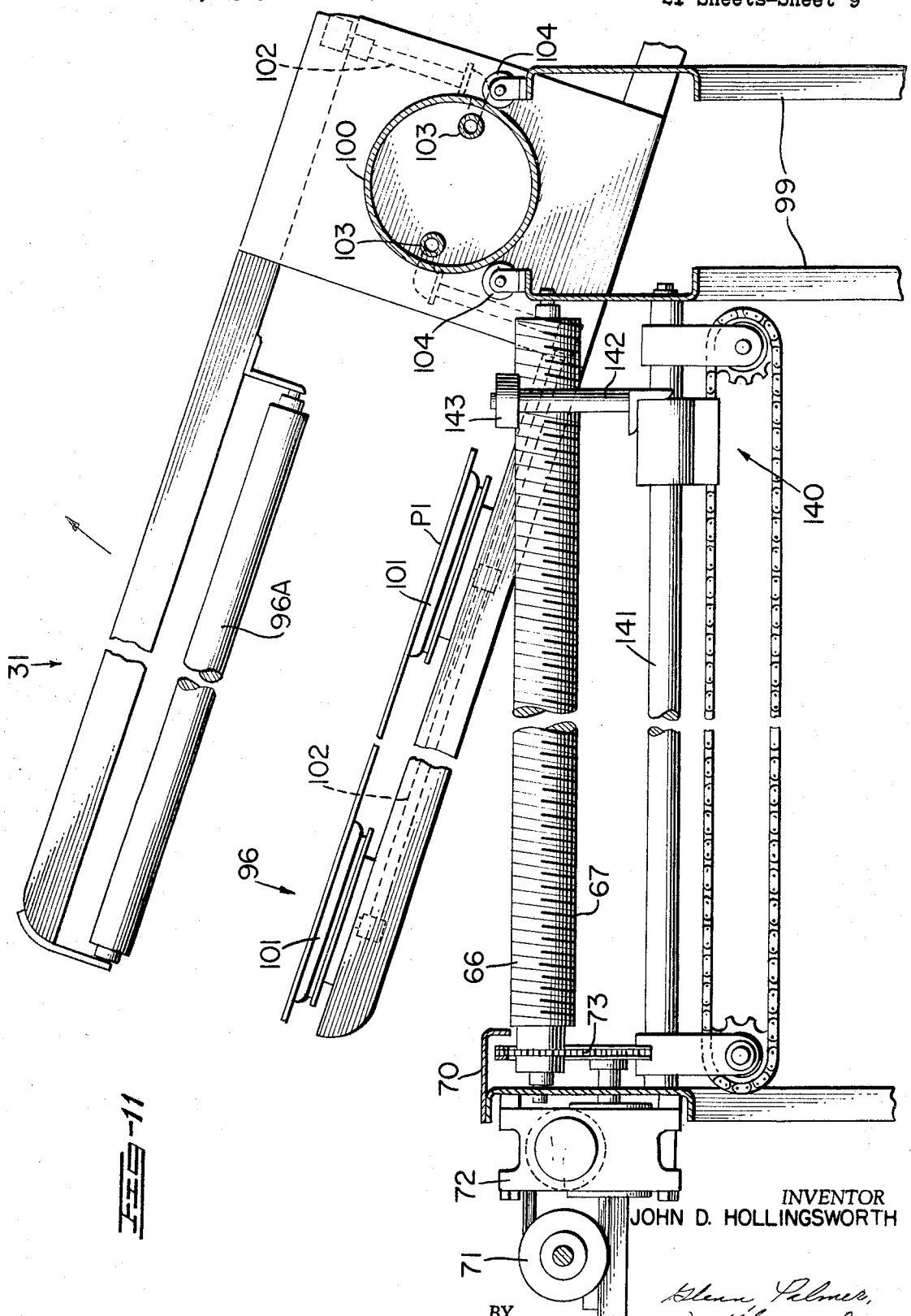

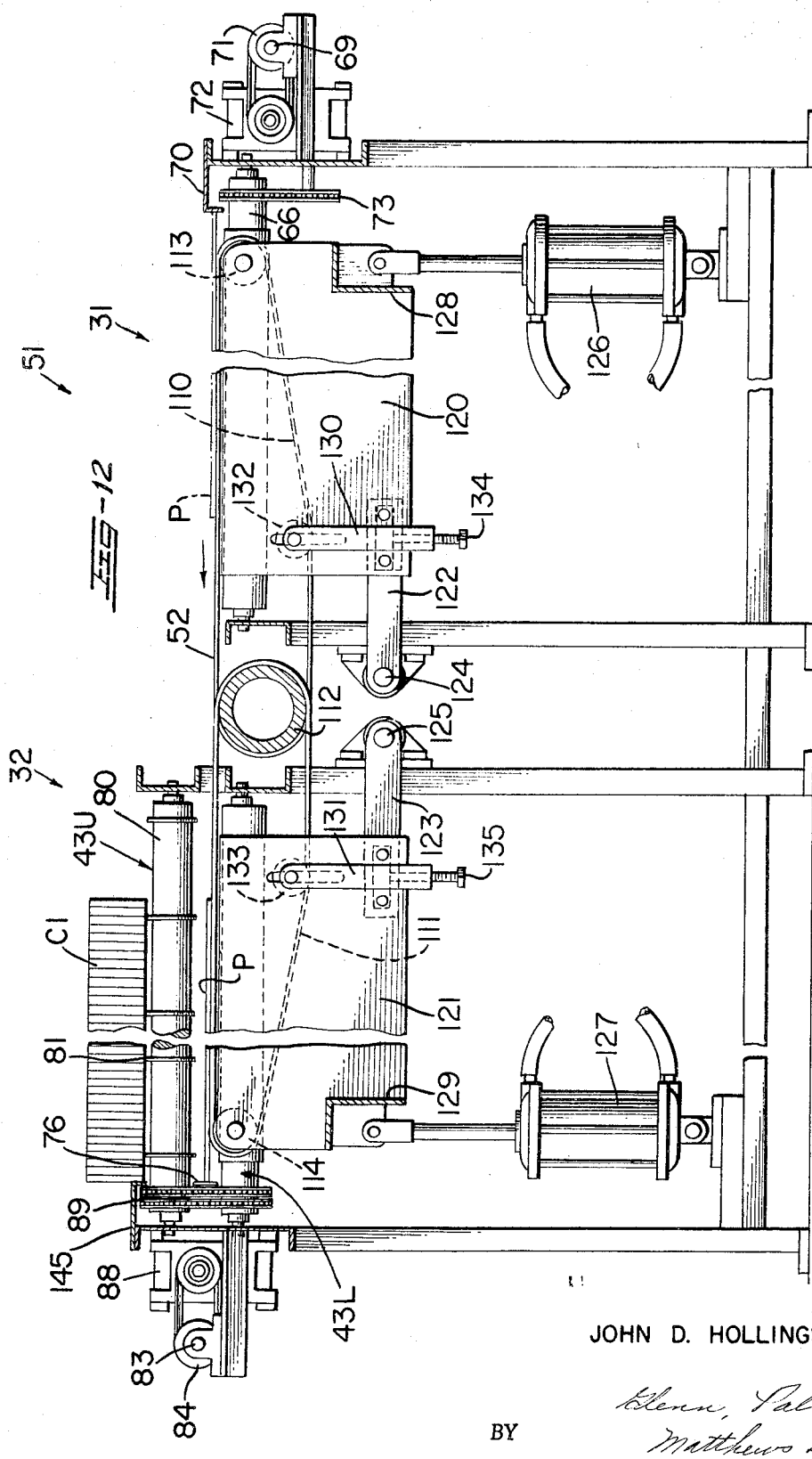

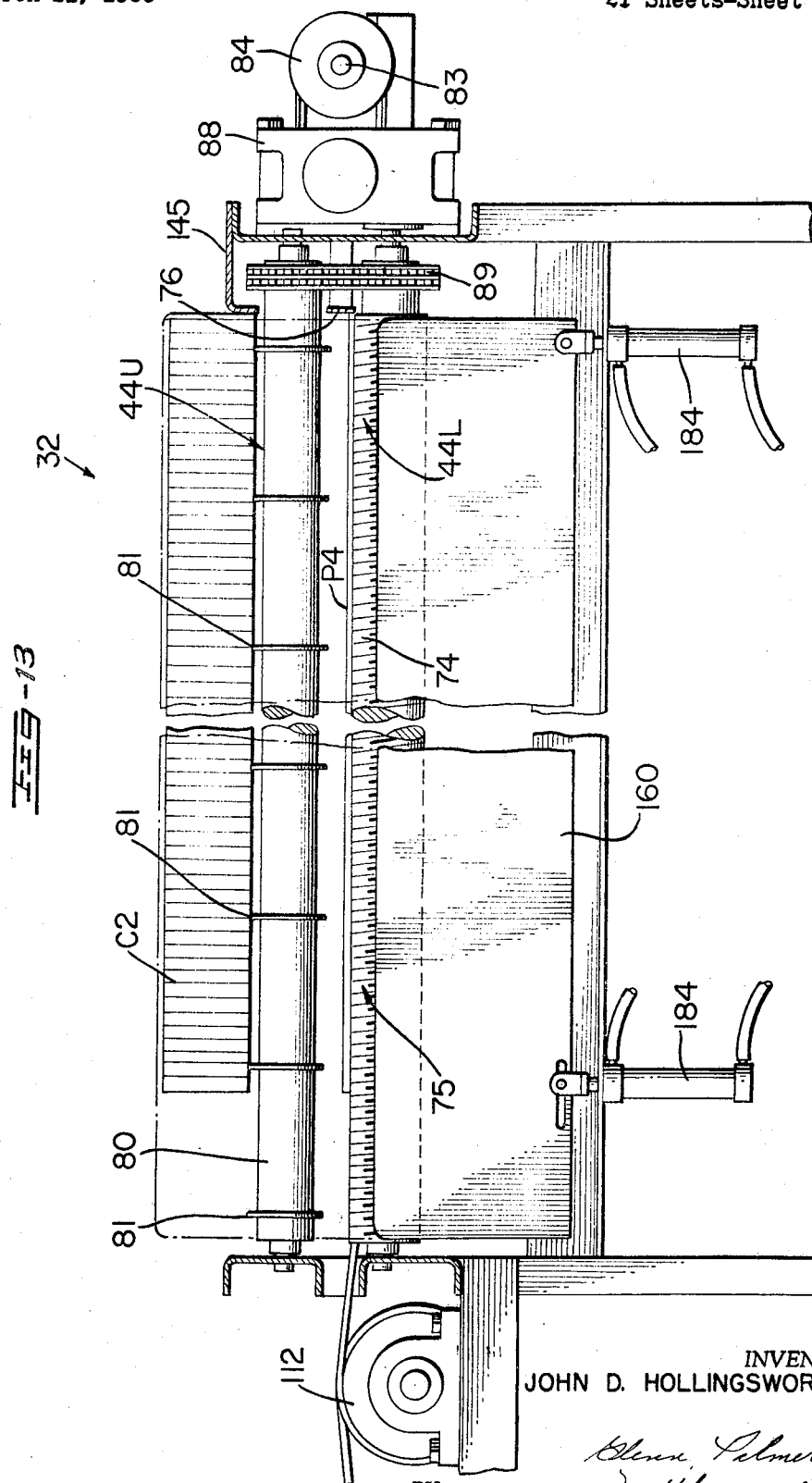

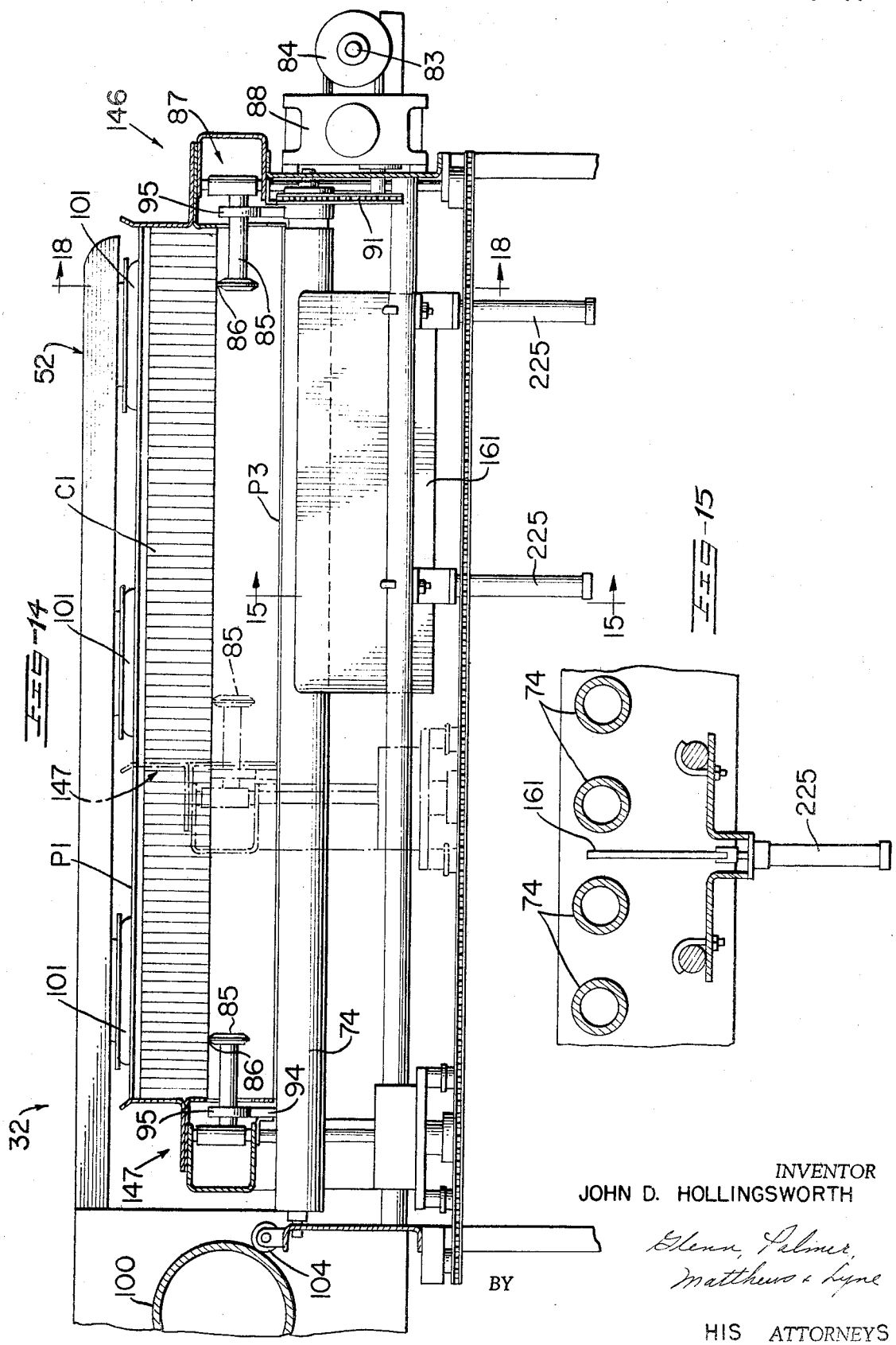

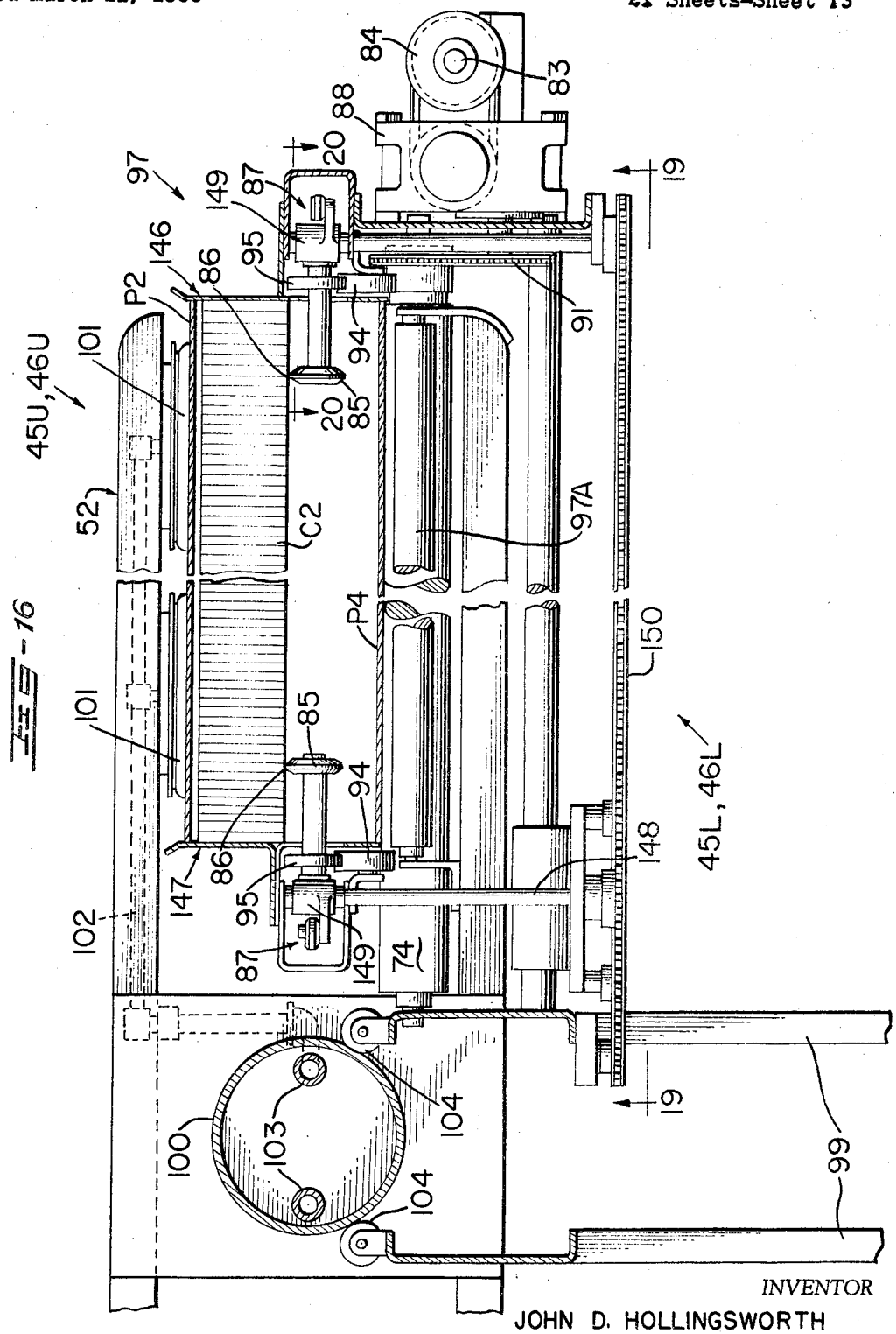

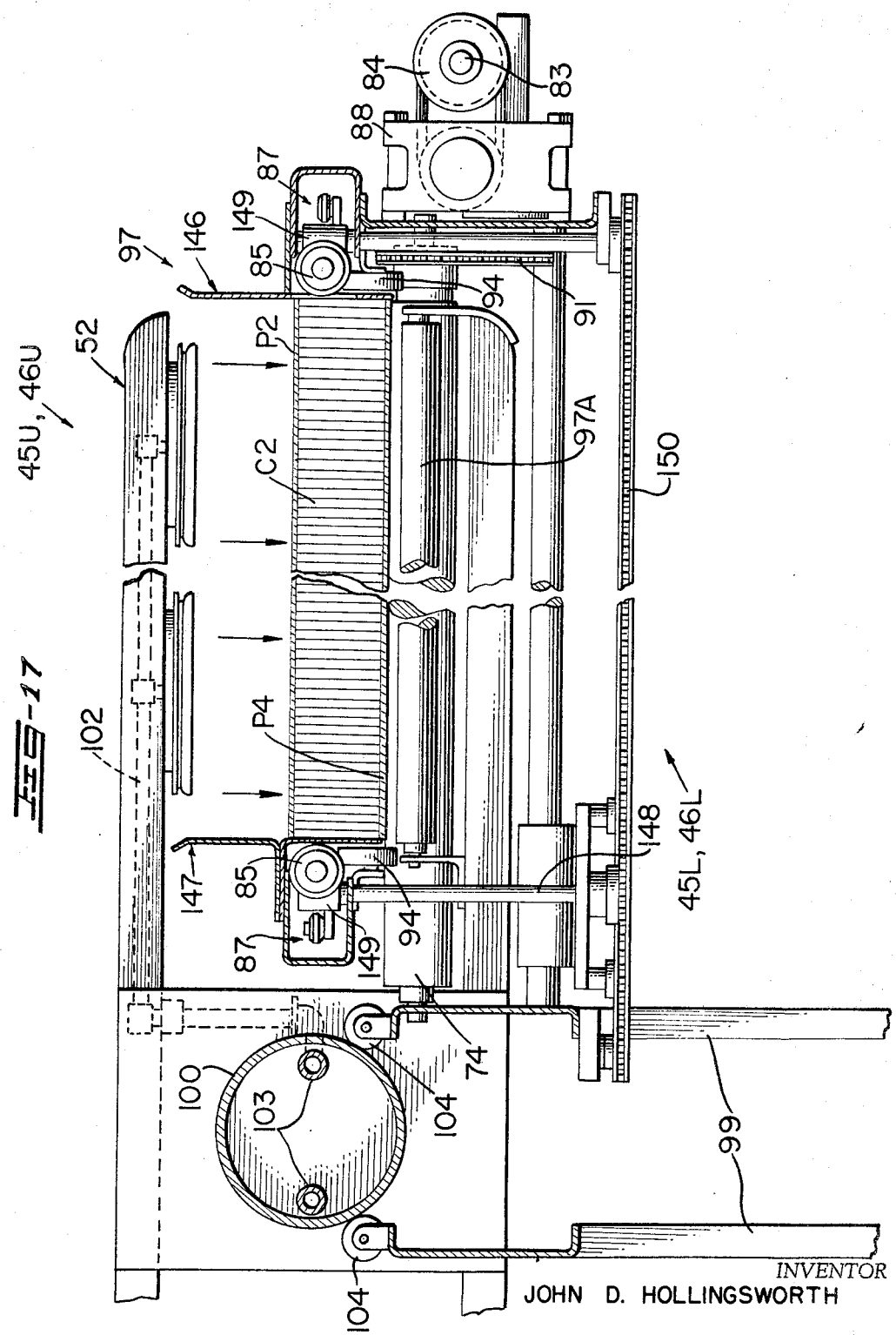

INVENTOR
JOHN D. HOLLINGSWORTH

BY

HIS ATTORNEYS

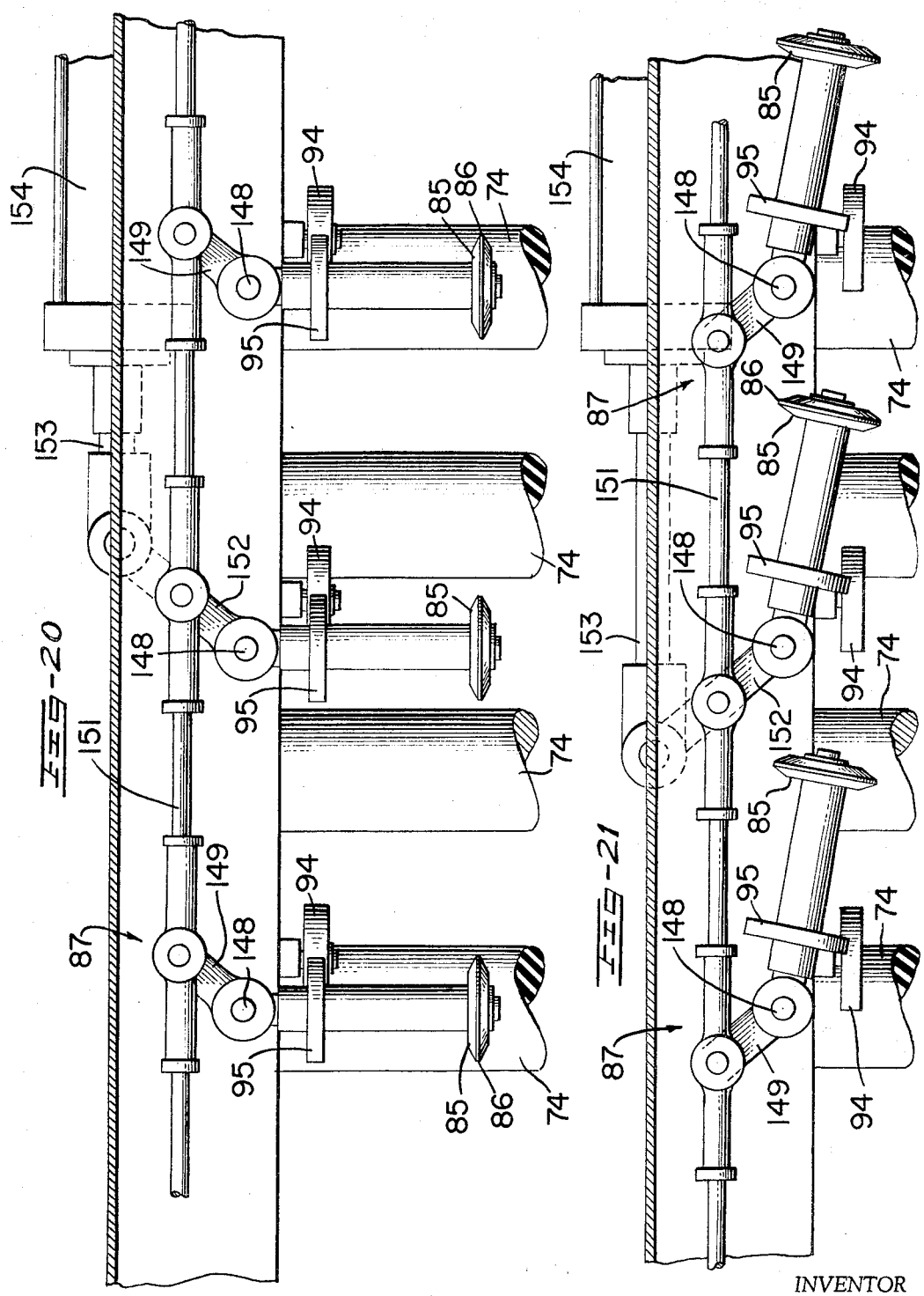

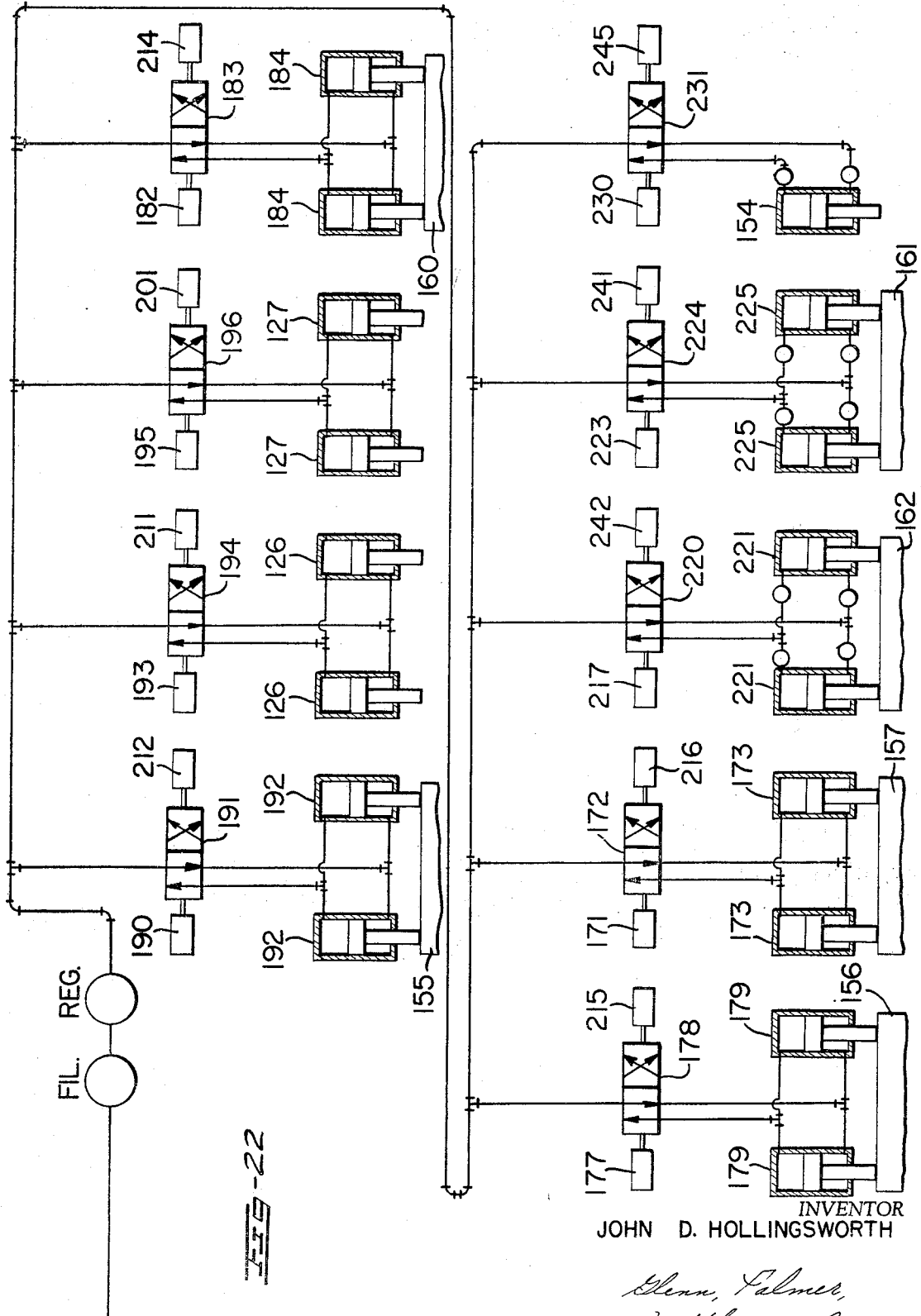

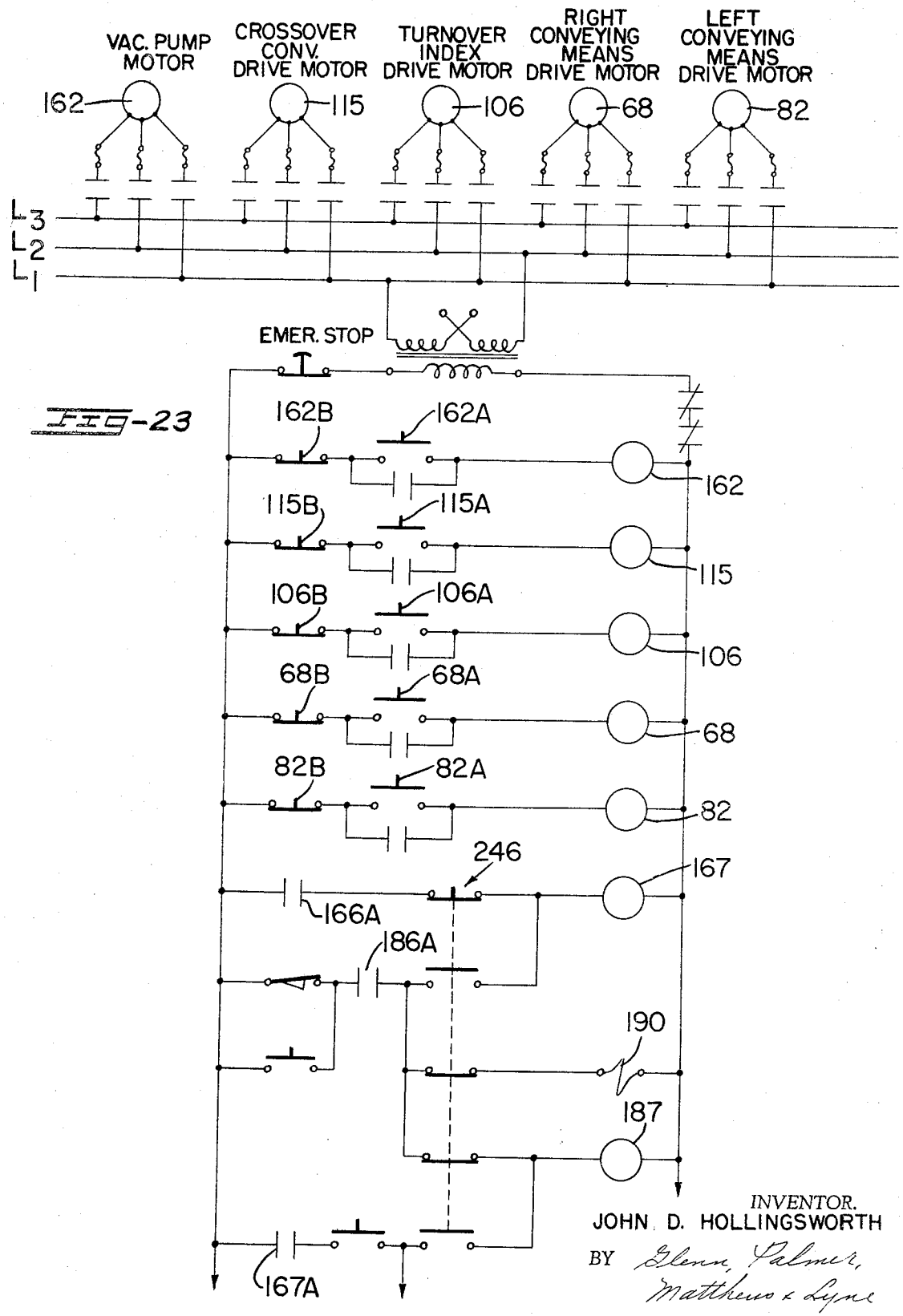

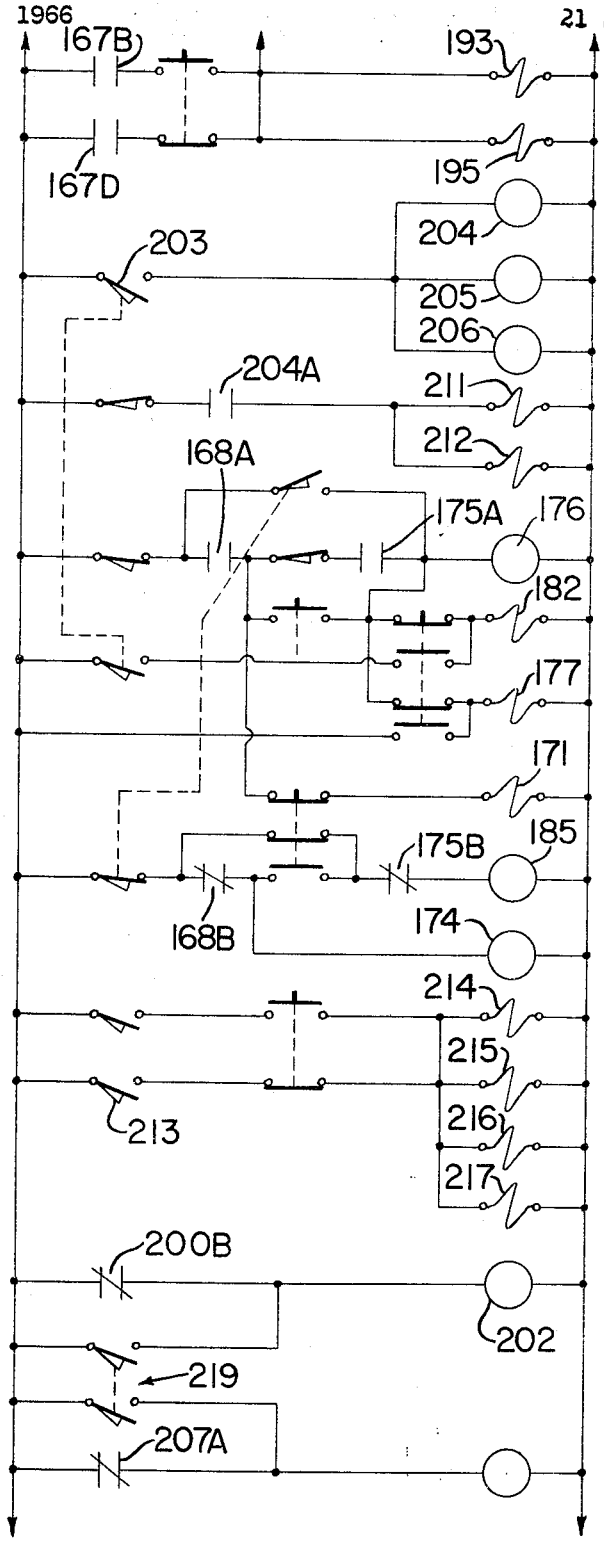

May 5, 1970    J. D. HOLLINGSWORTH    3,510,381
APPARATUS AND METHOD FOR MAKING LAMINATED PANEL MEANS
Filed March 11, 1966    21 Sheets-Sheet 21
POSITION "B"    POSITION "C"    POSITION "D"
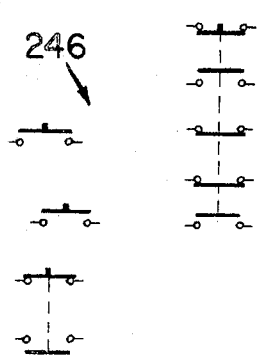
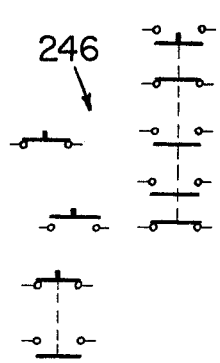
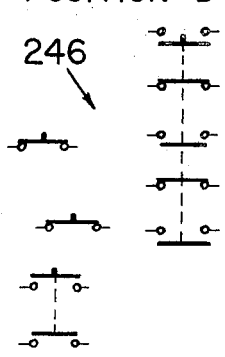
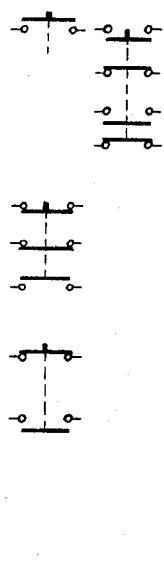
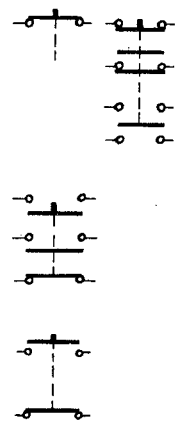
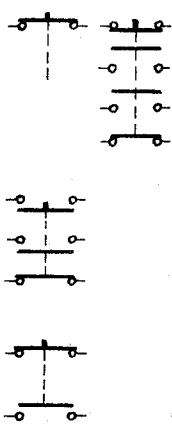
FIG-26
INVENTOR.
JOHN D. HOLLINGSWORTH
BY Glenn, Palmer,
Matthews & Lyne
HIS ATTORNEYS United States Patent Office 3,510,381
Patented May 5, 1970

3,510,381
APPARATUS AND METHOD FOR MAKING
LAMINATED PANEL MEANS
John D. Hollingsworth, Chesterfield County, Va., assignor to Reynolds Metals Company, Richmond, Va., a corporation of Delaware
Filed Mar. 11, 1966, Ser. No. 533,604
Int. Cl. B32b 31/00; B65g 57/00
U.S. Cl. 156—313                        21 Claims

ABSTRACT OF THE DISCLOSURE

An apparatus and method for making laminated panel means such as honeycomb panels. The apparatus utilizes a single-deck horizontal conveyor cooperating with a double-deck horizontal conveyor arranged adjacent and parallel thereto. A rotary transfer device is used to move a top panel from the single-deck conveyor and hold such top panel means in suspended relation over a laminating position. A lateral transfer device is used to laterally move a bottom panel from the single-deck conveyor to the lower deck of the double-deck conveyor and to said laminating position. A central core is conveyed on the top deck of the double-deck conveyor to the laminating position with such core being arranged beneath the top panel whereupon the top panel and core are dropped onto the bottom panel at the laminating position to form an associated honeycomb panel. The conveyors provide substantially rectilinear movement of each panel means and of the completed honeycomb panel essentially in one direction to enable a more efficient materials handling operation.

This invention pertains to laminated panel means and more particularly to an improved apparatus and method for making a laminated panel construction.

A problem with currently used apparatus and methods for making laminated panel constructions such as honeycomb panels is the excessive cost to produce such panels. In addition, the currently available apparatus are not only expensive but are also unduly complicated thereby resulting in unnecessary handling of the components which are assembled together to make a laminated panel.

Accordingly, it is a feature of this invention to provide an improved apparatus for making laminated panels which is of simple construction, efficient to operate, and provides laminated panels of maximum structural strength.

Another feature of this invention is to provide an apparatus for making laminated panels automatically and in a sequential manner with minimum disruption of the uniform flow of panel component materials from one end of such apparatus to the opposite end thereof.

Another feature of this invention is to provide an apparatus for making laminated panels using a plurality of conveying means arranged alongside each other in which the component parts of such laminated panels are properly aligned for lamination through the novel use and operating arrangement of component transferring means.

Another feature of this invention is to provide an apparatus for making laminated panels in which panel means defining an outer surface of such laminated panels is brought into position through the use of unique suction means grasping only one surface thereof while avoiding damaging or marring of such panel means in any way and precisely positioning such panel means for lamination.

Another feature of this invention is to provide an apparatus for making laminated panels in which panel means defining an outer surface of such laminated panels is positioned using conveyor means engaging only a bottom surface of such panel means and thereby laterally transferring such panel means to a desired position for lamination.

Another feature of this invention is to provide an apparatus for making laminated panels in which the apparatus can be readily adjusted and modified to produce laminated panels having various widths and lengths.

Another feature of this invention is to provide an apparatus for automatically transferring and positioning component parts of such laminated panel means into a laminating position and then removing the support from certain ones of such parts such that the action of gravity is sufficient to urge such parts together.

Another feature of this invention is to provide an apparatus for making honeycomb panels in which the electrical circuitry used for automatically sequencing such panels includes master selector switch means which is readily and quickly adjustable to permit automatic construction of panels of various sizes using the same apparatus while providing versatility in laminating either side or both sides of a central core section comprising a given honeycomb panel.

Another feature of this invention is to provide an apparatus for making laminated panels having a sandwich-like construction employing a single-deck horizontal conveyor arranged alongside a double-deck conveyor in which the central section of such construction is transferred along the upper deck of such double-deck conveyor and the outside panels of such construction are transferred along the single-deck horizontal conveyor and then moved into position above and below the central core section prior to laminating such outside panels thereto.

Another feature of this invention is to provide an improved apparatus and method for making laminated panels which requires a minimum of handling of the structural parts forming such panels.

Another feature of this invention is to provide an improved method for making laminated panels inexpensively.

Another feature of this invention is to provide a method for making a laminated panel construction employing gravity as the means for bringing the component parts of such construction together during the laminating step.

Another feature of this invention is to provide an improved method for making a laminated panel construction in which each surface means thereof carrying adhesive means is kept essentially intact to thereby provide maximum strength for such construction.

Another feature of this invention is to provide an improved method for making laminated panels using unique means for aligning panel components in a laminating position including use of vacuum means for suspending outer surface means of such panels in such laminating position.

Therefore, it is an object of this invention to provide an improved apparatus and method having one or more of the novel features of this invention as set forth above or hereinafter shown or described.

Other objects, uses, and advantages of this invention are apparent from a reading of this description, which proceeds with reference to the accompanying drawings forming a part thereof and wherein:

FIG. 1 is a perspective view showing a fragmentary portion of a honeycomb panel made using the apparatus and method of this invention.

FIG. 2 is a perspective view showing another fragmentary portion of a honeycomb panel made using the apparatus and method of this invention in which the central core has an outer surface panel laminated to only one of its sides, shown in the example as the bottom thereof.

FIG. 3 is a perspective view illustrating the general arrangement of the apparatus of this invention, showing the relative positions of the conveying means comprised of single-deck and double-deck conveyors arranged in parallel relation, the rotary transfer means, the lateral transfer means, and the position of some of the key operating components.

FIG. 4 is a plan view of the plant layout showing the arrangement and location of associated equipment used with the apparatus of this invention and in carrying out the method of this invention.

FIG. 5A is a plan view illustrating the conveying means forming the forward or upstream end of the apparatus with the upper deck of the first section of the double-deck conveyor cut away exposing the conveyor rolls therebeneath and showing the position of the various gates and electric eyes.

FIG. 5B is a plan view of the apparatus of this invention similar to FIG. 5A showing the terminal downstream end of the conveying means.

FIG. 6 is an end view of such apparatus looking in the direction of material flow showing a core of the honeycomb panel construction being supported on rotary knife-like edges of the upper left-hand conveyor, showing an outside panel in position on the right-hand conveyors, and also showing the lateral transfer mechanism in its retracted position.

FIG. 7 is an end view of the apparatus of this invention looking opposite the direction of material flow particularly illustrating the rotary transfer means provided on such apparatus and showing by arrows the manner of rotating such rotary transfer means and particularly illustrating the drive means for the single and double-deck conveyors.

FIG. 8 is a view on the line 8—8 of FIG. 5A with parts in section and parts broken away and looking opposite the direction of material flow illustrating the arrangement of typical gate means in the single-deck conveying means.

FIG. 9 is a view on the line 9—9 of FIG. 8, with parts in section and parts broken away, particularly illustrating the retracted and extended position of the gate means of FIG. 8.

FIG. 10 is an end view with parts broken away of the single-deck conveying means looking opposite the direction of material flow and showing the position of the rotary transfer device prior to engagement of a top panel and also showing the position of an adjustable guide carried on such single-deck conveying means.

FIG. 11 is an end view similar to FIG. 10 showing the rotary transfer means partially rotated about its axis of rotation, and also showing vacuum means illustrated as suction cup means holding a sheet thereto.

FIG. 12 is an end view on the line 12—12 of FIG. 5A, with parts in section and parts broken away, illustrating the lateral transfer means of the apparatus of this invention in its actuated position and showing the two positions of panel means laterally transferred thereby.

FIG. 13 is an end view on the line 13—13 of FIG. 5B, showing the bottom surface panel means in its laterally transferred position with the central core in position thereabove.

FIG. 14 is a view on the line 14—14 of FIG. 5B showing a central core section supported on oppositely arranged short spindle means, with the top panel held by vacuum means in suspended relation over such core section and with the bottom panel supported on the lower section of the double-deck conveyor means and particularly illustrating the adjustable guide means for the central core section showing an intermediate position of such adjustable guide means by dotted lines.

FIG. 15 is a view with parts broken away on the line 15—15 of FIG. 14.

FIG. 16 is a view on the line 16—16 of FIG. 5B looking opposite the direction of material flow of the double-deck conveyor, with parts in section and parts broken away, particularly illustrating the spaced and aligned relation of the central core and of the top and bottom panels forming the laminated honeycomb panel construction.

FIG. 17 is a view similar to FIG. 16 in which the short spindle means have been rotated out of supporting position and toward the viewer allowing the central core and top panel to drop onto the bottom panel to form the laminated construction.

Figure 18:
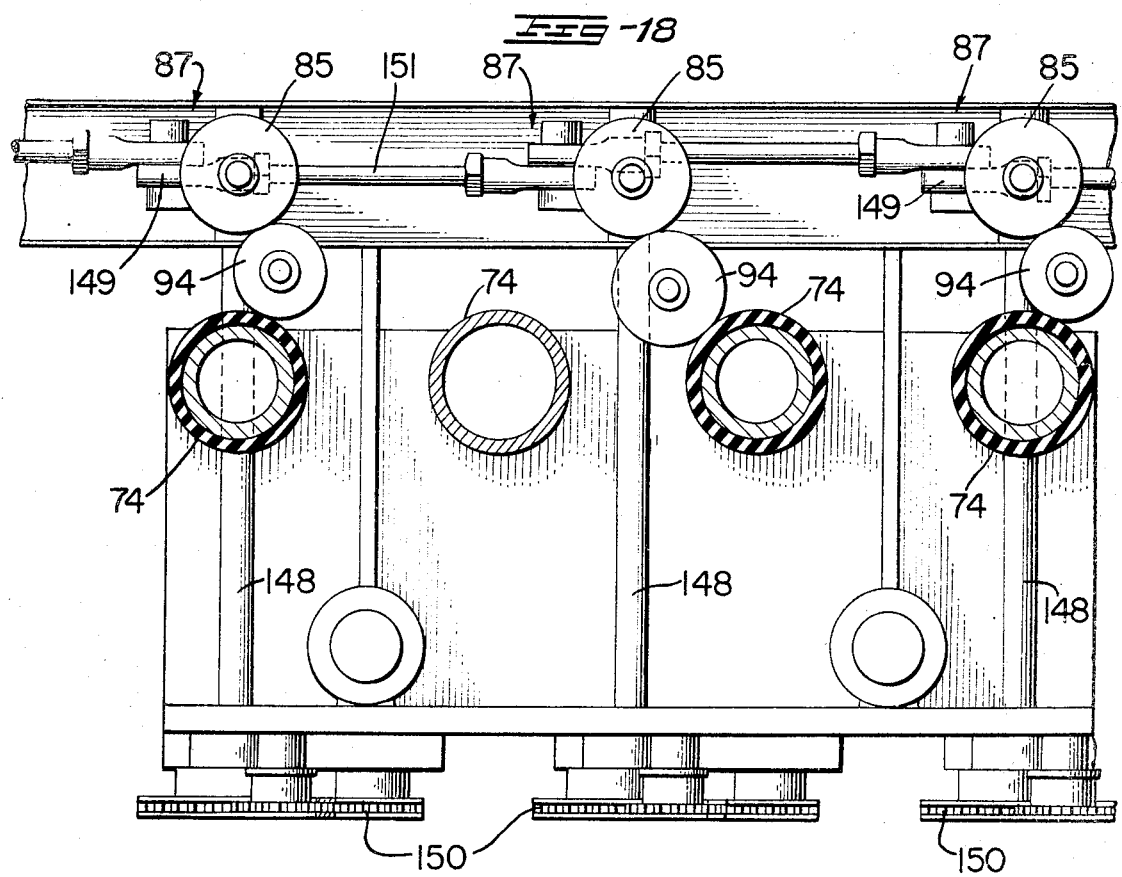

FIG. 18 is a view on the line 18—18 of FIG. 14, particularly illustrating the arrangement for driving the short spindles from the lower conveyor rolls.

Figure 19:
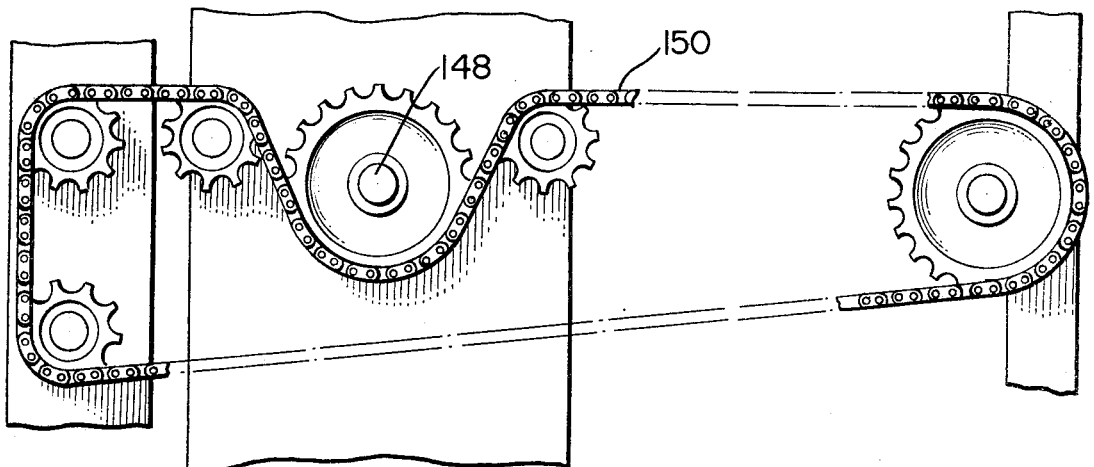

FIG. 19 is a view on the line 19—19 of FIG. 16, particularly showing the chain drive for pivoting the inner short spindles.

FIG. 20 is a view on the line 20—20 of FIG. 16, showing the short spindle means in their normal supporting position and showing an air piston for pivoting such spindle means.

FIG. 21 is a view of the short spindles of FIG. 20, with the air piston extended and showing such short spindles rotated out of supporting position, permitting the core and top panel to drop onto the bottom panel carried on the lower deck of the double-deck conveyors.

FIG. 22 is a schematic view illustrating the various pneumatic piston and associated fluid valve means with their respective solenoids for actuating the various gates in the conveying system, the cross-over conveyor actuating pistons, and the pistons pivoting the short spindles.

Figure 25:
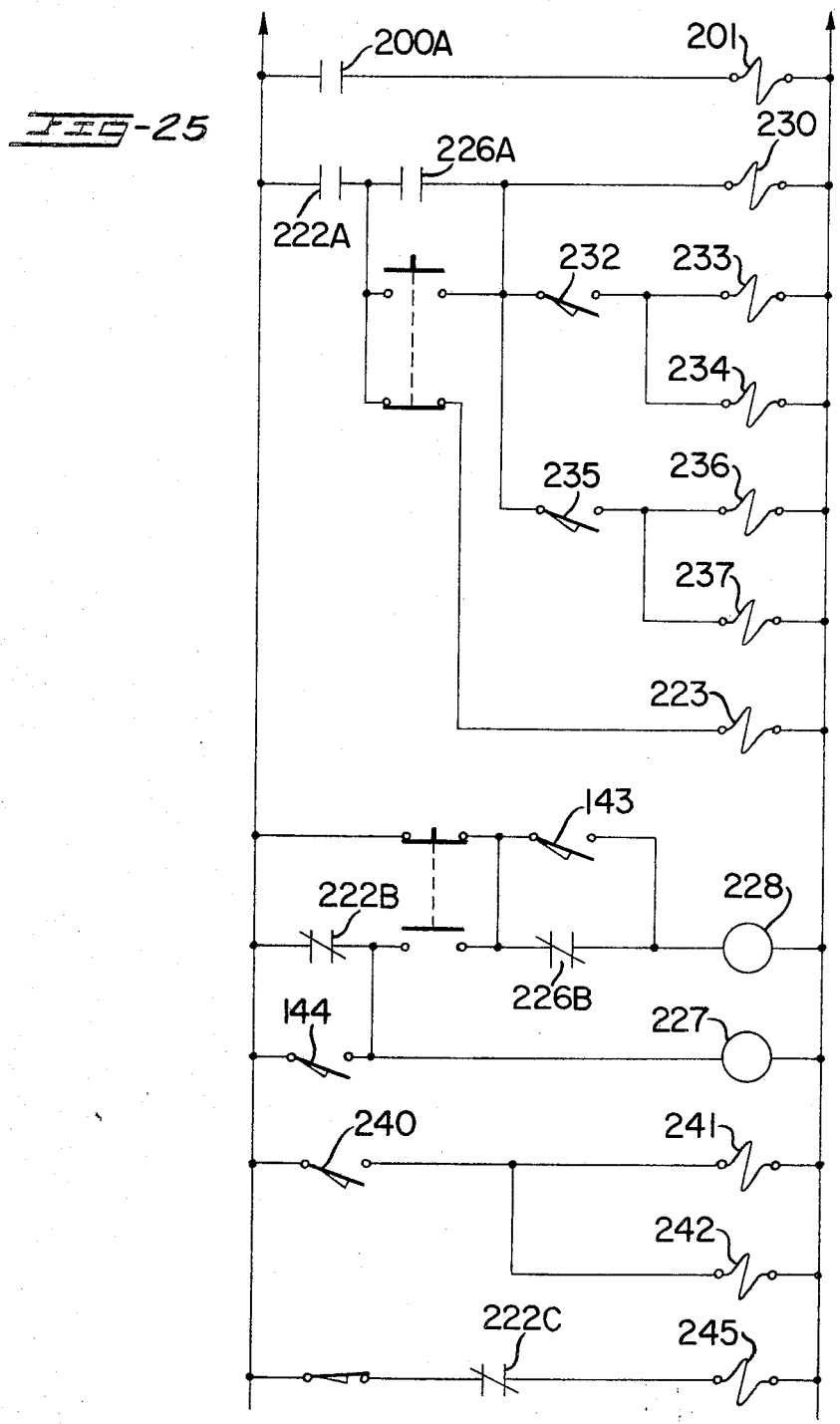

FIGS. 23, 24 and 25 are electrical diagrams of the automatic control system used with the apparatus of this invention, wherein top and bottom panel means can be introduced into the apparatus along with a central core and such components are moved in an automatic and sequential manner through the apparatus to form the honeycomb panel construction illustrated in FIG. 1.

FIG. 26 is an electrical diagram showing a master selector switch used in the electrical control system showing three other positions in addition to the position of FIGS. 23–25 to which such switch may be selectively actuated to control the automatic cycle of the apparatus of this invention enabling lamination of panel means of various sizes and in different ways.

While the various features of this invention are hereinafter illustrated and described as being particularly adaptable for making a laminated panel construction such as sandwich-type honeycomb panel means or the like, it is to be understood that the various features of this invention can be utilized singly or in any combination thereof to provide an apparatus and method for forming other types of similar constructions.

Therefore, this invention is not to be limited to only the embodiments illustrated in the drawings, because the drawings are merely utilized to illustrate examples of the wide variety of uses of this invention.

The apparatus and method of this invention are used to make laminated panel means such as honeycomb panels as particularly illustrated in FIGS. 1 and 2. The honeycomb panel illustrated in FIG. 1 shows a construction in which a central core has a bottom and top outer surface panel adhesively fastened thereto. FIG. 2 illustrates a honeycomb panel in which only the bottom surface panel has been adhesively fastened thereto, leaving the top surface intact for possible use in the manner illustrated or perhaps by adhesively fastening metal foil or the like to such top surface.

It will be appreciated that the apparatus and method of this invention enable the economical and efficient manufacture of laminated panel means as illustrated in FIGS. 1 and 2. In addition, by making minor adjustments to the apparatus provided both types of panels can be readily produced. The automatic electrical circuit provided with the apparatus of this invention is also quite versatile lending itself to minor adjustment to enable production of various types of panels in an automatic and sequential manner.

The apparatus disclosed may be adjusted to laminate panels of various sizes. Examples of panels capable of being produced on the apparatus disclosed range from 3 ft. wide x 6 ft. 8 in. long to 4 ft. 4 in. wide x 16 ft. long and range in thickness from a fraction of an inch to several inches. Obviously, the apparatus can be modified to produce panels of practically any size. In this exemplary embodiment of the invention the honeycomb panel illustrated in FIG. 1 will be described, in which a central core is used and an outer bottom and top surface are adhesively fastened to opposite sides of such central core. Further, this description will be for the simultaneous making of two panels four feet wide and eight feet long. In those instances where only one side of a core is laminated the apparatus of this invention may be used to laminate either the top or bottom thereof as viewed in the drawings.

GENERAL DESCRIPTION

As shown in FIGS. 3, 5A, and 5B of the drawings the apparatus 30 comprises first and second conveying means designated by the numerals 31 and 32 arranged side by side in adjoining relation. Conveying means 31 is arranged to the right of conveying means 32, looking in the direction of material flow, and in this example has four conveyor sections designated by the numerals 33, 34, 35, and 36 for carrying panel means such as outer panels each designated by the letter P. Conveying means 32 comprises four double-deck conveyors designated by the numerals 43, 44, 45 and 46 with the letter designation U being added to signify the upper deck conveyors and the letter L being added to signify the corresponding lower deck conveyors.

Transferring means is provided for automatically transferring first panel means comprising the laminated panel construction from one conveying means to the other. Such transferring means includes lateral transferring means provided for transferring panels laterally from right conveyors 33 and 34 to left conveyors 43L and 44L and comprises a plurality of lateral transfer devices each designated by the numeral 51. The transferring means further comprises rotary transfer means comprising a plurality of rotary devices 52 provided for engaging panels in right-hand conveyors 34 and 35 and turning such panels over upper lefthand conveyors 45U and 46U while holding such panels in suspended relation over such upper conveyors.

Thus, a first top panel P1 is moved over the right-hand conveyors and into engagement with a stop at the terminal end of conveyor 46. A second top panel P2 is moved onto conveyor 35. The rotary devices 52 engage panels P1 and P2 and turn such panels with their original top side facing downwardly while holding such panels in suspended relation over conveyors 45U and 46U.

A third bottom panel P3 and a fourth bottom panel P4 are each brought onto conveyors 33 and 34 respectively. Similarly, central core sections each designated by the letters C and used in making the central section of the panel construction of this example of the invention are brought onto upper left-hand conveyors 43U and 44U. The core sections have adhesive means applied to both sides thereof and are supported on rotary knife-like edges to prevent such adhesive means from sticking thereto. A core C1 is brought onto conveyor 44U while a core C2 is brought onto conveyor 43U. The lateral transfer devices 51 are then actuated to move panels P3 and P4 from their respective associated conveyors 34 and 33 to conveyors 44L and 43L. At this point in the operating sequence panels P1 and P2 are suspended over conveyors 46U and 45U respectively while panels P3 and P4 are supported below C1 and C2 respectively on their respective conveyors 44L and 43 L.

In an automatic and sequential manner cores C1 and C2 are transferred onto upper conveyors 46U and 45 U respectively and stopped in aligned relation below suspended panels P1 and P2. Simultaneously with transferring cores C1 and C2, panels P3 and P4 are likewise transferred onto their respective conveyors 45L and 46L.

Thus, center core C1 is carried on conveyor 46U with panel P3 spaced below it and panel P1 suspended above it, while core C2 is carried on conveyor 45U with panel P4 spaced below it and panel P2 suspended thereabove. In an automatic manner the short spindle arms of conveyor 45U and 46U are pivoted away from their associated cores thereby releasing cores C1 and C2 while simultaneously the vacuum is released from the rotary devices 52 releasing the suspended panels and allowing core C1 and panel P1 to fall on panel P3 to form one honeycomb panel while core C2 and panel P2 fall on panel P4 to simultaneously form the second honeycomb panel. Whereupon conveyors 33–36 and 45L and 46L are started to transfer the completed panels out of the laminating device and four more panels are brought onto the right conveying means or conveyors 33–36 to start another cycle.

In this general description adhesive means such as glue or the like has been applied to both sides of the central core. It will be appreciated that adhesive means may also be applied to the top and bottom panels or to the top and bottom panels alone and the apparatus of this invention assures such panels may be moved with their adhesive sides intact.

The apparatus 30 of this invention is used in a plant layout of the type illustrated in FIG. 4 to produce honeycomb panels. The flow of material is from left to right, as viewed in FIG. 4 and apparatus 30 is generally centrally located within such plant. The previously mentioned central cores C are provided from a feeder station 55. Similarly, a feeder station for outer panels P is illustrated at 56. The central cores are transferred from the feeder station 55 to an adhesive applying station shown at 60, while outer surface panels P are transferred to an adhesive applying station 61. As previously mentioned, in some cases it may not be desirable to apply adhesive means to one of the sides of the panels P. The cores and panels are then transferred to solvent drying ovens 62 and 63 respectively, at which ovens the adhesive means, such as glue, is dried sufficiently to prevent dripping from the associated cores and/or panels without impairing its adhesive qualities. From drying ovens 62 and 63, the cores and panels are introduced into the conveying means of apparatus 30, as generally previously described, and from apparatus 30 the completed honeycomb panels are introduced into a compressing station at 64 having rollers for compressing the panels together to give them added structural strength. From station 64 the honeycomb panels are transferred to a conveyor 65 for subsequent stacking and storage.

THE CONVEYING MEANS

The conveying means of apparatus 30 comprises first and second conveying means designated by the numerals 31 and 32, as previously mentioned and as shown in FIGS. 3, 5A, and 5B. Conveying means 31 and 32 are supported alongside each other and in adjoining relation on a suitable structural base.

Conveying means 31 comprises a plurality of horizontally arranged conveyor sections illustrated as four conveyor sections in this example and designated by the numerals 33, 34, 35, and 36. As will be apparent from the drawings conveying means 31 is a single-deck device. Conveying means 31 is used to transfer only the outside panels P in a rectilinear manner along the material flow path. Each conveyor 33–36 has a plurality of conveyor rolls, each designated by the numeral 66, and only a few representative ones have been thus designated in FIGS. 5A and 5B. The conveyor rolls 66 are suitably supported at their opposite ends for free rotation and are driven to provide the desired rate of movement of panels P therealong.

As shown in FIGS. 10 and 11 each conveyor roll 66 preferably has threads on its outer surface indicated generally at 67. The panels P are moved along conveying means 31 by rotating the conveyor rolls as will be described below and are guided on one side by a guide 70 carried along the outer side of each conveyor section 33–36.

Drive means is provided for conveying means 31 and as shown in FIG. 7 comprises an electric motor assembly 68 driving a shaft 69 which extends the full length of conveying means 31 and is mounted for rotation in a frictionless manner. Suitable drive means such as a V-belt drive 68A is provided between motor 68 and shaft 69 to enable rotation of shaft 69. Motor assembly 68 continuously drives shaft 69 once apparatus 30 is started. The various conveyor sections 33–36 of conveying means 31 are individually selectively coupled to rotating shaft 69 and driven thereby.

The coupling means comprise a plurality of four identical electric clutches each designated by the numeral 71. A clutch 71 is provided for individually coupling each conveyor section 33–36 to shaft 69 for movement of panels P along the associated section. Each clutch 71 is operatively connected by belt drives to a corresponding speed reducer means 72 and by associated chain drive means 73 to the conveyor rolls 66 of its associated conveyor to thereby rotate such rolls. The operation of each electric clutch 71, and hence the movement of panels over its corresponding conveyor, is controlled by the sequence established in the automatic control system.

Conveying means 32 comprises double-deck conveying means which is arranged alongside and adjoining conveying means 31. As previously mentioned conveying means 32 comprises four lower deck conveyors designated by the numerals 43L–46L and four upper deck conveyors designated by the numerals 43U–46U. Conveyors 43L–46L are arranged generally in the same horizontal plane as conveyors 33–36. Conveyors 43U–46U are arranged immediately above their associated lower conveyors and such upper conveyors are also arranged in a horizontal plane parallel to the first plane. The upper and lower conveyors of conveying means 32 each move material thereon in a rectilinear path and the flow of material thereon is controlled in an automatic and sequential manner by the electrical system to be later described.

As shown particularly in FIGS. 3 and 13, the lower conveyors 43L–46L each has a plurality of conveyor rolls 74 which are supported at their opposite ends for rotation on a suitable conveyor frame. Each roll 74 associated with conveyors 43L and 44L preferably has a threaded surface as indicated generally at 75. Conveyors 43L and 44L have guides designated by the numberal 76 along their outer sides for guiding panel P as it moves along such conveyors.

The rolls 74 associated with conveyors 45L and 46L may have threaded surfaces. However, it is preferable that they not have such threaded surfaces. The guiding for panels P3 and P4 as they travel along conveyors 45L and 46L is accomplished by guiding means to be later described. The outside surface of each roll 74 associated with conveyors 45L and 46L is preferably made of resilient material such as hard rubber or the like.

Upper conveyors 43U–46U carry cores C thereon as previously mentioned. Adhesive means is applied preferably to both the top and bottom surfaces of cores C. Conveyors 43U–46U include means assuring such adhesive means applied on the bottom surfaces of cores C is kept essentially intact as the cores move along such conveyors.

Upper deck conveyors 43U and 44U are generally identical and each has a plurality of rolls 80 extending completely across each conveyor. Conveyors 45U and 46U are generally identical and comprise oppositely arranged pairs of short spindles each designated by the numeral 85. Each spindle 85 engages the bottom surface of each core C adjoining one of its sides.

The conveyor roll means 80 and 85 provided in the upper deck conveyors 43U–46U each have rotary knife-like supporting means to keep the adhesive means on the bottom of each core essentially intact as previously mentioned. Each conveyor roll 80 has a plurality of rotary knife-like projecting edges 81 thereon at spaced apart locations thereacross and each short spindle 85 has a rotary knife-like projecting edge 86 adjacent its terminal end. Projecting edges 81 and 86 support each core C with a minimum of surface contact therebetween.

In this description reference has been made to knife-like edges. It will be appreciated, of course, from viewing the drawings that the edges referred to have a sufficiently wide transverse dimension to provide a suitable bearing area without marring the cores carried thereon. Also, the edges are provided on disc-like members projecting at spaced apart intervals along their associated conveyor roll.

As shown in FIGS. 14, 16, and 17 and as previously mentioned, upper deck conveyors 45U and 46U each comprise a plurality of cooperating pairs of short spindles, each designated by the numeral 85, and each having a rotary knife-like edge 86 adjacent its terminal outer end portion thereof for supporting the central cores thereon. Pivoting means indicated generally by the numeral 87 are provided for pivoting each spindle 85 from under the core carried thereon to allow such core to drop onto an associated bottom panel supported on the lower deck conveyors once the core has reached the second predetermined position. FIG. 16 shows the positions of the bottom panel, top panel, and central core prior to rotating the short spindles 85 generally parallel to the direction of material flow. FIG. 17 illustrates the short spindles rotated toward the viewer with the arrows representing the central core and top panel dropping on the bottom panel. It will be appreciated that the vacuum means carried on each of the associated rotary devices 52 has been released, permitting the top panel to drop. The operation and detailed description of the rotary devices and the vacuum means will be described later in this disclosure.

Drive means is provided for conveying means 32 and is generally similar to the drive means for conveying means 31. As shown in FIG. 7 such drive means comprises an electric motor assembly 82 driving a shaft 83 which extends along conveying means 32. Shaft 83 is mouted for rotation in a frictionless manner. Suitable coupling means illustrated as a belt drive 82A is operatviely connected between motor assembly 82 and shaft 83 to enable rotation of such shaft.

The operation of the drive means for conveying means 32 is generally similar to the operation of the drive means for conveying means 31. Motor assembly 82 continuously drives shaft 83 once apparatus 30 is started. The various sections of conveying means 32 are coupled to shaft 83 and uncoupled therefrom as desired and when coupled thereto are driven thereby. The coupling means comprise a plurality of electric clutches each designated by the numeral 84 operatively connected by belt drives to an associated speed reducer means 88 which in turn is connected by an associated chain drive means to an associated conveyor of conveying means 32. Each associated conveyor comprises a plurality of conveyor rolls 74 as previously mentioned.

Thus, as each electric clutch 84 is selectively engaged to shaft 83 the associated upper and lower conveyor rolls of conveying means 32 are rotated by their corresponding chain drive to simultaneously move the cores and bottom panels respectively along the upper and lower decks of conveying means 32.

Conveyor sections 43L and 44L are operatively linked to conveyors 43U and 44U by chain means 89 as illustrated in FIG. 13. These four conveyor sections are preferably driven together by coupling them to rotating shaft 83 using an associated electric clutch 84 driving chain 89 through an associated speed reducer 88. The cycling operation of each clutch 84 is controlled by the electrical system to be described later.

The drive means for the short spindles 85 is particularly illustrated in FIGS 16–19. In this instance conveyor rolls 74 of each conveyor 45L and 46L are driven by an associated chain drive 91 operatively connected to an associate electric clutch 84 and a speed reducer for each conveyor 45L and 46L. Each rotating roll 74 in each conveyor 45L and 46L engages and drives an idler roll 94 carried on suitable structure at opposite ends of each conveyor roll.

Each roll 94 is driven by friction engagement and in turn similarly drives a cooperating roll 95 fixed on each spindle 85 to thereby rotate its associated spindle. Thus, it is seen that as conveyor rolls 74 are rotated to move the panel means therealong, the cooperating pairs of spindles 85 at opposite sides of each roll 74 are simultaneously rotated to move central cores C along conveyor sections 45U and 46U.

Having thus described the physical structural arrangement of the conveying means 31 and 32, and the conveyors associated therewith, as well as the manner of driving such conveyors so that the cooperating panel components can be moved therealong, the transferring means will be described next. The transferring means comprises rotary means for moving top panel means and lateral transfer means for moving bottom panel means of the honeycomb panel construction discussed in this disclosure and will be described in the order stated.

THE ROTARY TRANSFER MEANS

The rotary transfer means is particularly illustrated in FIGS. 7–11 of the drawings. FIG. 7 shows an end view of apparatus 30 looking opposite the direction of material flow in which the manner of rotating the rotary transfer means is illustrated. As shown in FIG. 5B, the rotary transfer means comprises a plurality of rotary devices, each designated by the numeral 52 and only one of which will be described in detail. Only a few representative ones will be identified in FIG. 5B. The operation of each rotary device 52 is identical and such devices are actuated and rotated simultaneously. The rotary devices 52 are supported for rotation about an axis between conveying means 31 and 32 and extending therealong in the direction of material flow.

Each device 52 has arm means extending normal to such axis and in this example preferably has a pair of arms arranged on opposite sides of such axis and designated by the numerals 96 and 97. It will be apparent from the drawings that the rotary devices 52 are only associated with conveyors 35 and 36 and operate to suspend top panel means over upper conveyors 45U and 46U. Arms 96 and 97 are fixed to a common shaft illustrated in this example as a right circular cylindrical shaft 100 having its axis coinciding with the axis of rotation of rotary devices 52 and arranged between conveying means 31 and 32.

As seen in FIG. 7, with arm 96 positioned under the first conveying means or under conveyor sections 35 and 36, the oppositely arranged arm 97 is simultaneously positioned above conveyors 45U and 46U and above the second predetermined position. Thus, during its operation it will be seen from the following description that as each rotary transfer device is rotated about its axis it releases a panel from one arm while simultaneously engaging a panel at its opposite arm, to thereby provide a continuous operation.

Each arm 96 and 97 has vacuum means, illustrated in this example as a plurality of vacuum cups 101, see FIG. 11. Cups 101 are suitably fastened to each arm 96 and 97 and vacuum lines 102 in each arm 96 and 97, shown by dotted lines; connect such vacuum cups to an associated vacuum supply line 103 carried within right circular cylindrical hollow shaft 100. Each supply line 103 is evacuated by a suitable vacuum pump, not shown, and driven by a vacuum pump drive motor 162 (FIG. 23).

As each arm 96 and 97 is alternately positioned under conveyors 35 or 36 the associated vacuum cups 101 engage only the bottom surface of a top panel carried on such conveyors. The suction provided enables such top panel to be grasped, turned over, and held in suspended relation over conveyors 45U and 46U and over the second predetermined position or laminating position. Simultaneously with one arm grasping a top panel at the right-hand conveyors the opposite arm releases a top panel carried thereby by releasing the vacuum on the associated cups of such opposite arm.

Shaft 100 is carried on a suitable frame 99, which is arranged between and is a structural part of conveying means 31 and 32. Frame 99 has a plurality of rolling bearing means or roller bearings 104 suitably supported thereon for rotation. Each roller bearing 104 engages the outer circumference of shaft 100 and thereby supports such shaft for rotation thereabout while assuring that shaft 100 and arms 96 and 97 can be rotated thereabout in a frictionless manner. Each arm 96 and 97 has an associated idler roll 96A and 97A respectively carried thereon.

The prime mover for rotating the rotary transfer devices 52 is shown in FIG. 7 and comprises a motor assembly 106, suitably coupled through an electric clutch 107 which is operatively connected through a cone drive gear reducer 108 to shaft 100. Motor 106 is energized at the beginning of a laminating operation and the electric clutch 107 is energized as required during the operation of apparatus 30 to rotate shaft 100 and simultaneously rotate devices 52 about the axis of shaft 100. The radial loads of shaft 100 are taken by roller bearings 104 while suitable provision is made to take the axial thrust loads of shaft 100. As clutch 107 is energized the rotary action is to index each device 52 through an angle of 180 degrees. This indexing rotating action is repeated first bringing one arm carrying a panel over the laminating position and then another.

THE LATERAL TRANSFER MEANS

Apparatus 30 includes a plurality of lateral transfer means or devices each designated by the numeral 51 for transferring first panel means forming bottom panel means of the honeycomb panel construction. The lateral transfer means are shown in FIGS. 3 and 5A and are identical. Only a few representative ones are indicated in such figures.

A typical lateral transfer device 51 is shown in detail in FIGS. 6 and 12 and the component parts described are provided on each device 51. Each transfer device 51 operates to laterally transfer bottom panels of the honeycomb construction from the conveying means 31 to the lower deck of conveying means 32. Each of said lateral transfer devices comprises continuous loop belt means shown as a continuous loop crossover conveyor belt 110 extending across an associated conveyor 33 or 34 and a similar continuous loop crossover conveyor belt 111 arranged practically in line with belt 110 while extending across its associated conveyors 43L or 44L adjacent thereto.

Drive means is provided for belts 110 and 111 and such drive means comprises a common drive roll 112 supported between conveyors 33 and 34 and the lower conveyors 43 and 44 of the double-deck conveying means. As particularly illustrated in FIG. 12, one end of each belt 110 and 111 loops around drive roll 112 and is rotated thereabout. Pulley means such as a pair of belt pulleys 113 and 114 are provided at opposite ends of belts 110 and 111 respectively for supporting an associated belt for rotation. Each pulley 113 and 114 is arranged generally adjacent the outer side of an associated conveyor and opposite common drive roll 112.

Power means is provided for driving belts 110 and 111 and includes a motor preferably an electric motor 115, driving roll 112 through a chain and sprocket assembly 116.

Except during the process of laterally transferring bottom panels from one conveyor section to another, the lateral transfer means are kept in a retracted position, as illustrated in FIG. 6. The elevating means for each lateral transfer assembly 51 comprises plates 120 and 121, associated respectively with belts 110 and 111. Each plate 120 and 121 has a link 122 and 123, respectively, which is attached thereto at one end and each link is supported for pivoting movements about an associated pin 124 and 125, respectively, carried upon a central structural frame arranged between conveying means 31 and 32. The pulleys 113 and 114 are respectively supported for rotation about a suitable pin in the opposite terminal outer end portions of plates 120 and 121 respectively.

Fluid piston means, illustrated as a pair of pneumatic cylinders 126 for the right-hand conveyors 33 and 34 and a pair pneumatic cylinders 127 for the left-hand conveyors 43L and 44L are provided to raise their associated belts 110 and 111 respectively into transferring position.

A tie bar 128 is provided at the terminal outer end of plates 120 and each plate is fixed thereto and supported thereby, see FIG. 3. The cylinders 126 are arranged at opposite ends of bar 128 and operate to move all belts 110 up and down simultaneously. In a similar manner a tie bar 129 is provided at the terminal outer end of plates 121 and each plate is fixed thereto and supported thereby. Cylinders 127 are arranged at opposite ends of bar 129 and move belts 111 up and down simultaneously. Pistons 126 and 127 are actuated in response to signals from the automatic control system to be later described.

It will be seen, therefore, that in the deactuated position illustrated in FIG. 6, the cylinders 126 and 127 are each shown with their telescoping rod portions in a retracted position. In FIG. 12 the cylinders 126 and 127 are shown with their rod portions in an extended position thereby bringing their associated transverse belts 110 and 111 into engagement with an outer surface panel carried on right-hand conveyors 33 and 34 and such panel is moved laterally from one conveying means to the other. FIG. 12 shows panel P moved from its position shown by dotted lines on the right conveying means 31 to the left conveying means or the lower deck of the double-deck conveying means 32.

Each continuous belt 110 and 111 of lateral transfer device 51 has a surface which when brought into engagement with a panel to be transferred will not damage such panel. Such surface also provides sufficient friction to enable easy transfer.

Adjusting means is provided for taking up slack in each of the continuous loop belts 110 and 111. The adjusting means for belts 110 and 111 of each device 51 are generally identical and comprises vertical bars 130 and 131 adjustably supported on pivoting link 122 and 123 respectively. Each bar 134 and 131 has a pulley 132 and 133 respectively mounted for rotation at its upper terminal end, see FIG. 12, and an adjusting screw 134 and 135 at its respective opposite terminal end. Each screw 134 and 135 is used to move the vertical position of its associated pulley wheel and thereby provide the desired degree of tautness in its associated continuous loop belt.

It can be seen, therefore, that with this arrangement an outer panel forming a bottom panel of the honeycomb panel made by apparatus 30 is simply and efficiently laterally transfered by engaging only the lower side thereof by the continuous loop belts 110 and 111 and transferring such bottom panel laterally from conveyors 33 and 34 to associated conveyors 43L and 44L. Each bottom panel is also then further transferred along conveyors 43L–46L to a laminating position also referred to as a second predetermined position to form a sandwich-type honeycomb panel.

THE GUIDE MEANS

Guide means is provided for guiding the movement of the panel means in the single-deck conveyor system and in the double-deck conveyor system. The movement of the outer panels P along the conveyors 33–36 is guided along their outer edges by the previously mentioned guides 70. The panels P are guided along their inner edges by a plurality of guide assemblies each indicated generally by the numeral 140, see FIGS. 10 and 11. Each guide assembly 140 is supported on an associated spacer bar 141 by suitable brackets and has an upright rod 142 carrying a roller bearing unit 143 on the terminal end of rod 142. Roller 143 engages the edge of the panel which is opposite guide 70 and further assures that the panel is held against guide 70 as such panel moves along the material flow path on conveyors 33–36. The horizontal position of vertical rod 142 and hence of roller 143 is adjustable and such adjustment permits the lateral guiding and positioning of panels having different widths.

Guide means is also provided for the panel means conveyed on the double-deck conveyors. As illustrated in FIG. 13 and as previously mentioned, the lower deck of the double-deck conveyor system employs conveyor rolls 74. Each conveyor roll 74 associated with conveyors 43L and 44L preferably has a threaded outer surface 75. A guide 76 is provided for engaging and guiding the outer edge of each panel P. The outer surface panels conveyed on rolls 74 in this example of the invention define the bottom panels of the honeycomb construction. As each bottom panel P moves along conveyors 43L and 44L it is guided along its outer edge by its associated guides 76. Combination guide means is provided at the downstream end of conveying means 32 in association with both upper and lower decks of conveyors 45 and 46 for simultaneously guiding bottom panels and associated cores.

The guide means provided for the cores C carried on conveyor rolls 80 of conveyors 43U and 44U is illustrated in FIG. 13. As the central cores move along conveyors 43U and 44U they are guided by guide means 145 suitably supported on conveying means 32 to engage the outer edge of each core C.

The guide means provided at the downstream end of the double-deck conveying means, is illustrated in FIGS. 14, 16, and 17. Such downstream guide means comprise a plurality of guide means or assemblies each designated by the numeral 146 engaging the outer edges of the cores and panels carried on conveyors 45 and 46 each cooperating with a corresponding oppositely arranged assembly 147 associated with the inner edges of such cores and panels. Guide assemblies 146 and 147 are generally identical. As will be apparent from FIG. 14, each guide assembly 147 is movable transverse the direction of material flow and may be adjusted at any position along the width of the double-deck conveyors. This adjustable feature makes it possible to form laminated panel constructions of different widths. An intermediate position of guide assembly 147 is shown by dotted lines in FIG. 14. The adjustment of each guide assembly 147 is done in advance of forming laminated panels of a desired width. It will be apparent also that irrespective of the position in which a guide assembly 147 is positioned, the spindle 85 associated therewith is readily driven by lower conveyor rolls 74, through the associated friction drive roll 94.

Each guide assembly 146 and 147 has an upwardly extending member which is flared slightly outwardly on each side, such that as a top panel and core is moved into aligned relation at the laminating position the outwardly flared portion assures that the top panel will be guided precisely on to the core section once the vacuum has been released to drop such top panel. It will be appreciated that the various guide means assure that the top panels, bottom panels, and central cores are precisely aligned at the laminating position.

THE LAMINATING MEANS

The means provided for laminating each honey-comb panel (i.e., bring the various component panel means together to form the sandwich-type construction) is illustrated in FIGS. 17–21. Each short spindle 85 is suitably supported for essentially frictionless rotation on a vertically extending pivot column 148.

Each pivot column 148 extends vertically downwardly below an associated spindle 85 and has suitable sprocket wheel means fixed to its lower terminal end, see FIGS. 16 and 19. A linking chain 150 cooperates between the sprocket wheel means at the lower end of each column 148 so that as each given pivot column and associated spindle 85 located on the outer side of conveyors 45U and 46U is pivoted (slightly rotated) an oppositely arranged inside spindle 85 is also simultaneously rotated by chain 150. The means provided for pivoting the pivot-columns 148 and associated short spindles 85 is arranged at the outer side of conveying means 32 and comprises a pivoting device 149 fixed concentrically around the upper end portion of an associated column 148 and having an arm extending normally therefrom.

The normally extending arm of each pivoting device or link 149 is suitably linked to a rod assembly 151. A master link 152 is provided and is connected at one of its ends to one of the centrally located outer pivot columns, 148, at its midpoint to push rod assembly 151, and at its opposite end to the terminal end of the piston rod 153. Piston rod 153 is extended and retracted by a suitable air cylinder 154.

FIG. 20 illustrates air cylinder 154 with its rod 153 in its retracted position and shows each spindle 85 extending normally to the direction of material flow and thus in supporting relation. FIG. 21 illustrates the air cylinder extended and spindles 85 in their retracted position and generally parallel to the direction of flow of the laminated panel components. Thus, it is seen that to drop a core C previously carried on short spindles 85 it is merely necessary to energize air cylinder 154 and thereby pivot spindles 85 out of supporting position permitting gravity to urge the outer panels and the central core section together to form a laminated panel construction.

THE GATE MEANS

As illustrated in FIGS. 5A and 5B, a plurality of gate means are provided in apparatus 30. The gates are used in connection with both the right-hand conveying means 31 and the left-hand conveying means 32. Each conveyor 33, 34, and 35, has a gate 155, 156, and 157 associated respectively therewith at its terminal downstream end. In addition, conveyor 36 has a fixed stop 158 at its terminal end. In a similar manner, the left-hand conveying means 44, 45, and 46 each has a gate associated respectively therewith and indicated by the numerals 160, 161, and 162. The gates 160–162 operate to stop material flow on both the upper and lower decks once such gates are actuated. Each gate operates in timed sequence with its associated conveyor and the operation thereof will be more clearly explained in the detailed operation presented hereinafter. The operation of the gates and other operating components of apparatus 30 is sequenced, so that cores, top, and bottom panels of a honeycomb construction, for example, can be programmed in an automatic sequential manner along such apparatus enabling such honeycomb panel to be constructed automatically without necessitating manual interference.

DETAILED OPERATION

The detailed operation of the apparatus and of the method of this invention will be more readily understood by making reference to FIGS. 3, 5A, 5B, and FIGS. 22–25. The detailed operation will be described in this example of the invention in connection with the simultaneous making of two 4 ft. x 8 ft. honeycomb panels. Four outer panels P1–P4 will be introduced onto apparatus 30 along with two central cores C1 and C2. The manner of forming a pair of honeycomb panels using these major components will be readily understood from this description.

The automatic system is placed in operation by energizing all of the electric motors 68, 82, 106, 115, and 161 in the system by pressing the associated start switches indicated by the letter designation A. The stop switches therefor are indicated by the same numeral, followed by the letter designation B.

Panel P1 is placed upon and proceeds down the right-hand conveyor section 33 and trips a suitable switch illustrated in this embodiment of the invention as an electric eye 166. Actuating electric eye 166 completes a circuit to a stepping relay 167 and causes it to step to its first position and close its normally open contacts 167A. Panel P1 continues along conveyors 33–36 and strikes stationary stop 158 at the terminal terminal end of the conveyor 36. An electric eye 168 is provided in association with conveyor 36 and adjacent stop 158. Electric eye 168 controls normally open contacts 168A and normally closed contacts 168B. As panel P1 actuates electric eye 168, its contacts 168A are closed to energize a solenoid coil 171 (see FIG. 22) and actuate a pneumatic switcher valve 172, from its deactuated position illustrated, permitting flow to enter the head of associated pistons 173 and thereby raise gate 157. Simultaneously therewith, normally closed contacts 168B are opened, which opens the circuit to an electric clutch relay 174, to disengage the electric clutch associated with conveyor 36 and thereby stop conveyor 36.

Panel P2 is conveyed along the right-hand conveyor section and actuates electric eye 166 thereby stepping relay 167 to its second position and closing its contacts 167B. Panel P2 strikes gate 157 and is stopped thereby and trips another electric eye 175 arranged adjacent gate 157 and upstream thereof. Electric eye 175 controls normally open contacts 175A and normally closed contacts 175B. Closing contacts 175A energizes an electric clutch relay 176 to engage electric clutch 107 and start the 180 degree rotation of the rotary transfer devices 52. Closing contact 175A also energizes a solenoid coil 177, which actuates a pneumatic switcher valve 178 to provide fluid flow to a pair of pistons 179 to raise gate 156 at the terminal end of conveyor section 34. Closing contact 175A also energizes a solenoid coil 182 to actuate a pneumatic switcher valve 183, providing fluid flow to a pair of pneumatic pistons, each designated by the numeral 184, to thereby raise gate 160 on the left-hand conveying means 32. Opening contact 175B deenergizes an electric clutch relay 185 thereby disengaging an associated electric clutch 71 thereby stopping right conveyor section 35.

Panel P3 is conveyed along right-hand conveyors 33 and 34, energizing electric eye 166 and thereby actuating stepping relay 167 causing it to step to its third position. Panel P3 proceeds along conveyor 34 and strikes gate 156, which is now in its raised position. Panel P3 actuates an electric eye 186 arranged adjacent gate 156 and slightly upstream thereof which controls normally open contacts 186A. Closing contacts 186A energizes an electric clutch relay 187 to uncouple an associated electric clutch 71 which stops the movement of conveyor 34. Simultaneously therewith, actuating electric eye 186 also energizes a solenoid coil 190 which switches a pneumatic switcher valve 191 and thereby provides fluid flow to a pair of cooperating pistons 192 to raise gate 155 arranged at the terminal end of conveyor 33.

Panel P4 proceeds down right-hand conveyor 33 and trips electric eye 166 thereby stepping relay 167 to its fourth position 167D. This energizes the lateral transfer means to raise the cross-over conveyor belts 110 and 111 as will be presently described. Closing contacts 167D energizes a solenoid coil 193 of a pneumatic switcher valve 194 to provide fluid flow to pistons 126 and thereby raise the associated right-hand conveyor belts 110. In a similar manner, closing contacts 167D also energizes a solenoid coil 195 of a pneumatic switcher valve 196 to provide fluid flow to pneumatic pistons 127 and thereby raise the associated left-hand conveyor belts 111. The cross-over conveyors designated by the numerals 110 and 111 respectively for the right and left-hand conveyors engage panels P3 and P4 and transfer both panels to the lower deck of the double-deck conveyor and conveyors 43L and 44L.

Panel P3 laterally transferred to the left-hand lower conveyor 44L actuates an electric eye 200 at the terminal end of conveyor 44L closing its normally open contacts 200A and opening its normally closed contacts 200B. Closing contacts 200A energizes a solenoid coil 201 of pneumatic switcher valve 196 thereby porting fluid flow to the opposite side of pistons 127 to lower the left cross-over conveyor belts 111. Opening contacts 200B deenergizes electric clutch relay 202 which uncouples an associated electric clutch to stop conveyors 43L and 44L simultaneously.

Upon transferring panel P4 onto conveyor 43L it also energizes a limit switch 203. Energizing limit switch 203 actuates a time delay relay 204 controlling a pair of normally open contacts 204A which are closed for the time determined by relay 204. Actuating switch 203 also energizes stepping relay reset 205 which resets stepping relay 167 and energizes an electric clutch relay 206 to uncouple an associated clutch 71 for right conveyor 33.

Closing normally open contacts 204A energizes a solenoid coil 211 to right cross-over conveyor 110 and a solenoid coil 212 to gate 155. Coil 211 energizes pneumatic switcher valve 194 porting fluid to pistons 126 so as to lower the right cross-over conveyors 110. Solenoid coil 212 energizes pneumatic switcher valve 191 porting fluid flow to pistons 192 to lower gate 155.

The cores C1 and C2 are conveyed on upper conveyors 43U and 44U. As core C1 moves onto conveyor 44U it energizes an electric eye 207 to open its normally closed contacts 207A. Opening contacts 207A deenergizes electric clutch relay 210 to stop conveyors 43U and 44U and associated conveyors 43L and 44L.

As rotary transfer device 52 is rotated 180 degrees panels P1 and P2 previously supported on conveyors 35 and 36 are turned over and held in suspended relation over the laminating position. Rotating device 52 momentarily closes limit switch 213. Closing limit switch 213 energizes solenoid coils 214, 215, 216, and 217. Coil 214 actuates pneumatic switcher valve 183 thereby porting fluid to extended pistons 184 which lower gate 160. Energizing coil 215 actuates pneumatic switcher valve 178 thereby porting fluid flow to pistons 179 to lower gate 156 at the terminal end of conveyor section 34. Energizing coil 216 actuates pneumatic switcher valve 172 thereby porting fluid to pistons 173 to lower gate 157 at the terminal end of conveyor 35. Energizing coil 217 actuates pneumatic switch valve 220 thereby porting flow to pistons 221 and raising left gate 162 located at the terminal end of the left conveyor sections 46.

As gate 160 reaches its lowered position it actuates a limit switch 219. Actuated limit switch 219 completes a circuit to electric clutch relay 202 to start conveyor sections 43 and 44. Conveyor sections 43 and 44 are started as relay 202 energizes an associated electric clutch 84.

Sheet P3 and core C1 are moved down the left conveyors and against gate 162. When both P3 and C1 are against gate 162, and they both must be in position, an electric eye 222 is energized. Electric eye 222 controls a normally open contact 222A and a normally closed contact 222B. Closing contact 222A energizes solenoid coil 223 which actuates a pneumatic switcher valve 224 porting fluid to a pair of pistons 225 which raise left gate 161. Opening contact 222B deenergizes electric clutch relay 227 of an associated electric clutch thereby stopping left conveyors 46L and 46U.

Sheet P4 and core C2 proceed along conveyors 45L and 45U and strike gate 161 now raised. An electric eye 226 is provided adjoining gate 161 and upon engagement of gate 161 by both panel P4 and core C2 electric eye 226 is energized. Actuating electric eye 226 actuates its normally closed contacts 226B and normally open contacts 226A. Opening contacts 226B deactuate an electric clutch relay 228 to uncouple an associated electric clutch 84 and stop conveyors 45L and 45U. Closing contacts 226A energizes solenoid coil 230 actuating pneumatic switcher valve 231 to port fluid to piston 154 to thereby extend the rod end thereof and pivot spindles 85 thereby dropping central cores C1 and C2 on bottom panels P3 and P4 respectively carried on their associated lower conveyors. At the same time the vacuum to the arm of rotary device 52 holding panels P1 and P2 over the laminating position is turned off thereby dropping such panels on cores C1 and C2 respectively thereby laminating the outer panels and the central cores together to form the honeycomb construction.

The operation of the vacuum pick-up of each rotary device 52 will now be explained in connection with the automatic operation of the system. Assume that when the apparatus 30 is first started each rotary device has its arm 96 under the right conveyors and arm 97 over the left conveyors, with switch 232 having been closed by rotated assembly 52. At this point the vacuum on arm 96 controlled by a solenoid 233 is turned off and the vacuum on arm 97 controlled by solenoid 234 is on. As contacts 226A are actuated solenoid coils 233 and 234 respectively are energized to turn on the vacuum on arm 96 and turn off the vacuum on arm 97. As device 52 is rotated 180 degrees for the next cycle the vacuum control device deenergizes switch 232 and simultaneously energizes a switch 235 of such vacuum control device. At this point the vacuum on arm 96 is on (with arm 96 holding a panel over the left-hand conveyors) and the vacuum on arm 97 is off. As contacts 226A are again closed during the laminating phase of the cycle a pair of solenoid coils 236 and 237 respectively turn off the vacuum to arm 96 and turn on the vacuum to arm 97. With each cycle either switch 232 or 235 is energized to alternate the vacuum action to assure that a top panel is always properly picked up and released by each arm.

As the conveyor pivot cylinder 154 extends to its extended position, it closes a contact 240 which energizes solenoid coils 241 and 242. Coil 241 actuates solenoid switcher valve 224 porting flow to pistons 225 to lower left gate 161. Solenoid 242 actuates pneumatic switcher valve 220 to actuate pistons 221 to lower gate 162.

Lowered gate 161 energizes a limit switch 143 while lowered gate 162 energizes a limit switch 144. Limit switches 143 and 144 actuate electric clutch relays 228 and 227 respectively to couple their associated electric clutches 84 and start left conveyors 45 and 46 and convey the laminated honeycomb panel out of apparatus 30.

As the laminated panel means clears electric eye 222 its normally closed contacts 222C return to their closed position thereby energizing a solenoid coil 245. Coil 245 actuates switcher valve 231 to retract pivot cylinder 154 and return spindles 85 to their supporting positions.

The automatic laminating cycle is commenced again as a panel is introduced on apparatus 30 and actuates electric eye 166.

Thus, it is seen that an apparatus has been provided with suitable electrical and pneumatic circuitry to enable transfer of bottom and top panels as well as central core sections across conveying means 31 and 32 to a laminating position in an automatic and sequential manner such that the panels and cores need not be touched or interfered with manually. In addition, the outer panels are moved by grasping and/or engaging only one of their surfaces making it easy to apply adhesive means to the opposite sides thereof if desired.

The automatic operation is fast and efficient and with minimum delay. A master selector switch indicated by the numeral 246 has been shown in FIGS. 23–25 in what will be designated its A position. Position A has been used in the preceding detailed description for positioning four outer panels each 8 feet in length for forming two top panels and two bottom panels in association with a pair of central cores. The basic circuitry presented is such that by shifting the master selector switch 246 to any one of the three additional positions B–D as illustrated in FIG. 26 of the drawings it is possible to laminate central cores of a honeycomb construction in various ways as will be presently described. A sufficient amount of circuitry has been shown in FIG. 26 to enable each position to be easily compared with position A. The rest of the circuit for all positions B, C, and D is the same as shown for position A in FIGS. 23–25.

For example, by moving the master selector switch to position B it is possible to position two 8 ft. sheets of outer panels for bottom laminating to two central core sections. By moving the selector switch 246 to position C it is possible with the circuitry presented to laminate a 16 ft. sheet on the top and another on the bottom of a central 16 ft. core section. By moving the selector switch to position D it is possible in a similar manner to laminate a 16 ft. core section with a 16 ft. bottom outer panel.

The detailed description for laminating central cores of various lengths with bottom panels or top and bottom panels will not be presented in this disclosure; however, by reference to FIGS. 23–25 along with FIG. 26 the automatic operation for the various modes will be apparent to one skilled in the art.

THE METHOD

Having described the apparatus and associated components for making a laminated panel construction in an automatic and sequential manner it will be appreciated that a unique method also exists for making laminated panels. The apparatus disclosed in this exemplary embodiment of course also carries out the method; however, the method presented would lend itself to the use of other apparatus or to the manual making of panels following the steps outlined herein.

Basically the method comprises the steps of conveying first or outer panel means to a first predetermined position while conveying second panel means such as a central core section to a second predetermined laminating position. The outer panel means is then transferred from the first predetermined position into spaced and aligned relation with the second panel means at the second predetermined position and held there. Finally, the first and second panel means are brought together while they are in an aligned relation and laminated to form a panel construction.

In this example of the invention two, 4 ft. by 8 ft., sections of honeycomb panels are made in a simultaneous manner. First panel means used to form top panels P1 and P2 and having a sheet-like construction are conveyed in a first generally horizontal plane and along a rectilinear path to a first predetermined position.

Using vacuum means and without touching the upper surface of panels P1 and P2 the lower surface of each panel is grasped and the panels are raised, turned over, and help by the grasped lower surface in suspended and aligned relation over a second predetermined position.

Central core sections C1 and C2 are conveyed from a feeder station to an adhesive applying station and adhesive means is applied to its top and bottom sides. The adhesive means on cores C1 and C2 are then preferably partially dried to provide better adhesive qualities.

The central cores C1 and C2 are then conveyed in a second generally horizontal plane spaced apart from the first horizontal plane and in a second rectilinear path parallel to the first path first to an intermediate position and ultimately to the previously mentioned second predetermined position or laminating position.

Cores C1 and C2 are conveyed with their bottom surfaces on knife-like edges to prevent the adhesive means from being wiped therefrom and with their upper surfaces intact.

First panel means used to form a pair of bottom panels P3 and P4 are moved to a first predetermined position. The first predetermined position in this instance is different from the first predetermined position for panels P1 and P2. Panels P3 and P4 are moved along the first generally horizontal plane and along a rectilinear path.

Panels P3 and P4 are then transferred laterally and to a position immediately under the position of cores C1 and C2 at their intermediate position. The means employed to laterally horizontally shift panels P3 and P4 is preferably belt means which engage only the lower surface of panels P3 and P4 and provide the lateral transfer action.

Cores C1 and C2 are then conveyed along the second rectilinear path using the knife-like edges previously mentioned to the second predetermined position or laminating position. Preferably simultaneously therewith panels P3 and P4 are conveyed immediately below the cores C1 and C2 respectively to the second predetermined position.

Panels P1–P4 and cores C1 and C2 are preferably guided while being conveyed in their associated horizontal paths and are arranged in aligned relation at the laminating position so that panels P1 and P3 are arranged on opposite sides of core C1 and spaced therefrom and panels P2 and P4 are arranged on opposite sides of core C2 while being similarly spaced therefrom.

With the honeycomb panel components arranged as mentioned above the support means for cores C1 and C2 is released and the vacuum is released from panels P1 and P2 allowing gravity to urge the associated components together.

Cores C1 and C2 are preferably moved from the previously intermediate position on oppositely arranged sets of knife-like edges which engage their lower surfaces on opposite sides thereof and which can be pivoted out of supporting position for the laminating step.

While this description has discussed the method step where adhesive means is only applied to the cores C1 and C2. It will be appreciated that adhesive means could be applied to the upper surfaces of the panels P only or both the panels P and cores C. In addition, the honeycomb panel components are all conveyed with their adhesive surfaces essentially intact.

After laminating the outer panels P to their associated central cores C they are preferably compressed together to provide added strength.

It will be appreciated that for economy of construction it may be desirable to accomplish the method of this invention automatically. Furthermore, the method lends itself to the use of horizontally extending conveyor roll means which support, transfer, and help guide the various panel components as they move into laminating position.

This disclosure has made reference to "left," "right," "left-hand" and "right-hand" conveyors as well as "upper," "lower," "top," bottom," etc. These designations have been used for ease of description and are determined generally by viewing the various apparatus as presented in the drawings and looking in the direction of material flow. These designations are not to be construed as limiting in any way.

Thus, it is seen this invention has provided an improved apparatus for constructing laminated panel means efficiently, economically, and with minimum handling of component parts. The apparatus includes unique means assuring adhesive means applied to the component parts of the panel means is kept essentially intact to thereby provide improved strength.

Further, this invention provides an improved method for the efficient and economical construction of laminated panel means.

While the form of the invention now preferred has been disclosed as required by statute, other forms may be used, all coming within the scope of the claimed subject matter which follows.

What is claimed is:

1. A method of making a laminated sandwich-type panel construction, which comprises a top and bottom panel and a core, comprising the steps of: conveying first panel means, which are the top and bottom panels, in a first horizontal plane and along a rectilinear path in one direction to a first predetermined position, conveying second panel means, which is the core, in a second horizontal plane vertically spaced from said first plane and generally in said one direction along a second rectilinear path parallel to said one path to a second predetermined position, transferring first panel means from said first predetermined position into spaced and vertically aligned relation both above and below said second panel means at said second predetermined position, laminating said panel means together in said aligned relation to form said panel construction, and conveying said formed panel construction in a rectilinear path in said one direction, said conveying steps providing said rectilinear movement of said panel means and formed panel construction in said one direction enabling a more efficient materials handling operation.

2. The method as set forth in claim 1 in which said transferring step comprises the steps of: grasping the lower surface of associated first panel means used to form top panel means of said panel construction at a first predetermined position for said top panel means, turning said top panel means over, and holding said top panel means by said grasped lower surface in spaced and aligned relation over said second predetermined position.

3. The method as set forth in claim 1 in which said transferring step comprises the steps of engaging the lower surface of associated first panel means used to form bottom panel means of said panel construction at a first predetermined position for said bottom panel means, laterally shifting said bottom panel means in a direction transverse said rectilinear paths and immediately under said second rectilinear path, and transferring said bottom panel means into spaced and aligned relation immediately below said second panel means at said second predetermined position.

4. The method as set forth in claim 1 in which said laminating step comprises releasing said panel means held in spaced and aligned relation one above the other at said second predetermined position so they are urged together by gravity and further comprising the step of compressing said panel means together to form a high strength panel construction.

5. The method as set forth in claim 1 and further comprising the preparation steps for said panel means of, applying adhesive means to the top and bottom surface of said second panel means, partially drying said surfaces to provide better adhesive qualities, said second panel means being conveyed with its lower surface engaging spaced apart knife-like edges to prevent said adhesive means from being wiped therefrom and with its upper surface intact, each first panel means being conveyed and transferred with its upper surface intact and by engaging only the lower surface thereof, and said transferring step comprising the steps of, grasping the lower surface of associated first panel means used to form top panel means of said sandwich-type panel construction at a first predetermined position for said top panel means, turning said top panel means over, holding said top panel means by said grasped lower surface in spaced and aligned relation over said second predetermined position, engaging the lower surface of associated first panel means used to form bottom panel means of said sandwich-type construction at a first predetermined position for said bottom panel means and laterally shifting said bottom panel means horizontally in a direction transverse said rectilinear paths and immediately under said second rectilinear path, and transferring said first panel means into spaced and aligned relation immediately below said second panel means at said second predetermined position, and in which said laminating step comprises removing said knife-like edges from under said second panel means while simultaneously releasing said top panel means enabling gravity to urge said panels together to form said construction.

6. The method as set forth in claim 5 comprising the additional preparation step of applying adhesive means to the top surface of said first panel means which define both said bottom panel means and top panel means, said adhesive means being applied during movement of said first panel means in said first rectilinear path and prior to said transferring step.

7. The method as set forth in claim 5 in which said second panel means comprises central core means of a honeycomb construction and further comprising the step of compressing said laminated panel means together to form said honeycomb construction having maximum strength.

8. The method as set forth in claim 5 further comprising the steps of guiding said bottom panel means and said second panel means against movement transverse said rectilinear paths.

9. The method as set forth in claim 5 in which said second rectilinear path is spaced above said first rectilinear path and said bottom panel means is laterally shifted horizontally under said second panel means and transferred simultaneously therewith to said second predetermined position, and further comprising the step of guiding said panels against movement transverse said rectilinear paths during movement to said second predetermined position.

10. The method as set forth in claim 5 in which said steps are carried out in an automatic predetermined sequence.

11. The method as set forth in claim 5 in which vacuum means is utilized during said grasping step to grasp and hold said top panel means in suspended relation over said second predetermined position.

12. The method as set forth in claim 5 in which said top panel means is conveyed on a first set of conveyor roll means to its first predetermined position and then engaged utilizing vacuum means to grasp and hold said top panel means in suspended relation over said second predetermined position, said bottom panel means is conveyed on said conveyor roll means to its first predetermined position with belt means being employed to engage and laterally shift said bottom panel means immediately under the path of said second panel means onto a second set of conveyor roll means extending alongside said first set, said second set of conveyor means supporting said bottom panel means for movement immediately below said second panel means to said second predetermined position, said second panel means being supported on said knife-like edges provided on spaced apart disk-like members on a third set of conveyor roll means for moving said second panel means to said second predetermined position, and said third set of conveyor roll means having a section adjacent said second predetermined position comprising a plurality spindle means each having said knife-like supporting edge, wherein each spindle means pivots from under said second panel means allowing it and said top panel means to drop onto said bottom panel means during said laminating step.

13. An apparatus for making a laminated panel construction comprising: first generally horizontally arranged single-deck conveying means for carrying first panel means thereon in a first rectilinear path in one direction; said single-deck conveying means comprising a plurality of conveyors arranged one after the other and being adapted to position said first panel means in a first predetermined horizontal position; second double-deck conveying means defined by an upper deck and a lower deck with said upper deck moving second panel means generally in said one direction and in a second rectilinear path parallel to and above said first rectilinear path; said upper deck of said double-deck conveying means being adapted to position said second panel means in a predetermined second horizontal position; each of said decks being generally horizontally arranged and comprising a plurality of conveyors corresponding in number to and arranged alongside said conveyors in said first conveying means and with the lower deck being generally in the same horizontal plane as said first horizontally arranged conveying means; transferring means for transferring said first panel means from said first predetermined position into spaced and vertically aligned relation with said second panel means at said second predetermined position; said transferring means comprising rotary transfer means adapted to engage associated first top-defining panel means at said first predetermined position, turn said top-defining panel means over said second predetermined position, and hold said top-defining panel means thereto and suspended in said aligned relation over said upper deck at said second predetermined position; said transferring means further comprising lateral transfer means adapted to engage associated first bottom-defining panel means at said first predetermined position, laterally transfer said bottom-defining panel means in a substantially horizontal plane and under said second predetermined position, and support said bottom-defining panel means in said spaced and vertically aligned relation under said second predetermined position; and means for laminating said panel means together in said aligned relation.

14. An apparatus as set forth in claim 13 in which each of said plurality of conveyors in said single-deck conveying means has a plurality of conveyor roll means and conveyor guide means such that upon rotating said conveyor roll means to move said first panel means therealong said conveyor roll means assures said first panel means moves while being guided by said guide means, said upper deck conveying means comprising, a plurality of upper deck conveyor rolls, a plurality of rotary knife-like edges on each of said upper deck conveyor rolls engaging said second panel means at spaced apart locations thereacross, such that upon rotating said upper deck conveyor rolls to move said second panel means therealong said knife-like edges assure adhesive means carried on the bottom surface of said second panel means is kept thereon with minimum loss, guide means on said upper deck conveyor means for guiding the movement of said second panel means, and said lower deck conveying means comprising a plurality of conveyor rolls in each conveyor in said lower deck and guide means on said lower deck conveyor means cooperating with said guide means on said upper deck conveyor means to laterally align panel means carried on said upper and lower conveyor means one above the other.

15. An apparatus as set forth in claim 14 further comprising first adjusting means for adjusting the position of said guide means provided on said lower deck conveyor means and second adjusting means for adjusting said guide means on said upper deck conveyor means to thereby accommodate first and second panel means having different widths.

16. An apparatus as set forth in claim 14 in which said plurality of conveyors in said upper deck include at least one conveyor comprising cooperating pairs of short rotatable spindles arranged on opposite sides of said one conveyor and extending only a small fraction of the distance across said one conveyor, each of said spindles having a rotary knife-like edge for supporting said second panel means thereon while being rotatable to move said second panel means therealong, and pivoting means for pivoting each of said spindles from under said second panel means enabling said second panel means with its adhesive lower surface to drop onto said first panel means transferred therebelow at said second predetermined position to form said laminated panel construction.

17. An apparatus as set forth in claim 13 in which said rotary transfer means is carried for rotation about an axis between said first and second conveying means while extending therealong and having arm means extending normal to said axis, vacuum means on said arm means engaging said first panel means at said first predetermined position and holding said first panel means thereto, drive means operatively connected to rotate said arm means with said first panel means held thereto about said axis and into said aligned relation over said second predetermined position, and control means controlling said vacuum means, drive means, and conveying means to assure said vacuum is turned on to grasp said first panel means at said first predetermined position and is turned off to release said first panel means at said second predetermined position as said second panel means is aligned thereunder by said second conveying means.

18. An apparatus as set forth in claim 17 in which said rotary transfer means comprises, right circular cylindrical shaft means having its axis coinciding with said axis arranged between said first and second conveying means, rolling bearing means supported between said conveying means and engaging the outer circumference of said shaft means and supporting said shaft means for rotation, and said arm means comprising, a pair of balanced arms fastened to said cylindrical shaft means and extending in opposed directions therefrom such that with one of said pair of arms positioned under said first conveying means at said first predetermined position the other of said pair of arms is positioned above said second conveying means above said second predetermined position, with said control means actuating said vacuum means on said one arm while deactuating said vacuum means on said other arm.

19. An apparatus for making a laminated panel construction comprising; first conveying means for moving first panel means in a rectilinear path in one direction, said first conveying means being adapted to position said first panel means in a first predetermined horizontal position, second conveying means for moving second panel means generally in said one direction and in a second rectilinear path parallel to said first rectilinear path, said second conveying means being adapted to position said second panel means in a predetermined horizontal position, transferring means for transferring said first panel means from said first predetermined position into spaced and vertically aligned relation with said second panel means at said second predetermined position, and means for laminating said panel means together in said aligned relation to define said panel construction, said second conveying means having means adapted to provide continued movement of the completed laminated panel construction in said one direction and away from said apparatus, said rectilinear movement of said panel means and completed panel construction in said one direction enabling a more efficient materials handling operation, said first conveying means comprising first generally horizontally arranged single-deck conveying means and said second conveying means comprising double-deck conveying means arranged alongside said first conveying means and having an upper deck and a lower deck with each deck being generally horizontally arranged with said lower deck being generally in the same horizontal plane as said first horizontally arranged conveying means and said transferring means comprises lateral transfer means comprising a plurality of continuous loop belt means in said first conveying means and in the lower deck of said second conveying means, belt drive means supported between said first and second conveying means and supporting one end of said continuous loop of each of said belt means for rotation thereabout, belt pulley means each supported for rotation at the opposite side of each of said first conveying means and the lower deck of said second conveying means and each supporting the opposite end of a continuous loop of an associated belt means, power means for rotating said belt drive means, elevating means for elevating and supporting said belt pulley means and its associated belt means into and out of engagement with said panel means carried on said first conveying means and said lower deck of said second conveying means, such that upon moving said first panel means to said first predetermined position said elevating means elevates said pulley means and hence said belt means into engagement with said first panel means carried on said first conveying means and upon energizing said power means said belt means cooperate together to laterally transfer said first panel means onto the lower deck of said second conveying means and upon lowering said belt means out of engagement with said first panel means, said lower conveying means moves and supports said first panel means in said aligned relation under said second predetermined position, and automatic control means for controlling said conveying means, elevating means, and power means in a predetermined manner to sequentially move said first panel means under said second predetermined position.

20. An apparatus as set forth in claim 19 in which said elevating means comprises, plate means arranged parallel to said belt means, means supporting one end of said plate means adjacent said belt drive means for pivoting movement, means supporting each of said pulley means along a terminal end portion of an associated plate means, fluid piston means operatively connected to said terminal end portion of said plate means for raising and lowering an associated belt means into and out of engagement with said first panel means, and adjusting means for taking up slack in each of said continuous loop belt means.

21. An apparatus for making a sandwich-type laminated honeycomb panel construction comprising, first conveying means for moving first panel means in a rectilinear path in one direction, said first conveying means being adapted to position said first panel means in a first predetermined horizontal position, second conveying means for moving second panel means generally in said one direction and in a second rectilinear path parallel to said first rectilinear path, said second conveying means being adapted to position said second panel means in a predetermined horizontal position, transferring means for transferring said first panel means from said first predetermined position into spaced and vertically aligned relation with said second panel means at said second predetermined position, and means for laminating said panel means together in said aligned relation to define said panel construction, said second conveying means having means adapted to provide continued movement of the completed laminated panel construction in said one direction and away from said apparatus, said rectilinear movement of said panel means and completed panel construction in said one direction enabling a more efficient materials handling operation, said first and second conveying means being arranged alongside each other and move their associated panel means along parallel material flow paths in said one direction, said first conveying means being generally horizontally arranged and comprising, first conveyor means followed in material flow sequence by second conveyor means which has rotatable transfer means associated therewith, said rotatable transfer means comprising a part of said transferring means, said rotatable transfer means being supported for rotation about an axis arranged between said first and second conveying means while extending therealong and having arm means extending normal to said axis, vacuum means on said arm means engaging an associated first panel means forming top panel means of said honeycomb construction at said first predetermined position adjacent said second conveyor means and holding said top panel means thereto, drive means operatively connected to rotate said arm means with said top panel means held thereto about said axis and into said aligned relation over said second predetermined position, said second conveying means comprising double-deck conveying means having an upper and lower deck, said lower deck having third conveyor means followed in material flow sequence by fourth conveyor means arranged side by side with said first and second conveyor means respectively and being generally horizontally arranged, said upper deck having fifth conveyor means followed in material flow sequence by sixth conveyor means for carrying said second panel means forming central core means of said honeycomb construction with said fifth and sixth conveyor means being arranged immediately above and parallel to said third and fourth conveyor means respectively, pivoting means on said sixth conveyor means for pivoting said sixth conveyor means and thereby dropping central core means carried thereon, said first and third conveyor means each having belt means comprising a part of said transferring means and arranged to operate in a direction normal to said material flow path and each including means for bringing said belt means into engagement with associated first panel means forming bottom panel means of said honeycomb construction on said first conveyor means and transferring said bottom panel means horizontally onto said third conveyor means, said apparatus further comprising automatic control means for automatically and sequentially controlling the movement of said panel means so that said top panel means is automatically brought onto said second conveyor means engaged by said rotatable transfer means and held in suspended relation over said sixth conveyor means at said second predetermined position and said bottom panel means is brought onto said second conveyor means and laterally transferred by said belt means onto said said third conveyor means and then moved over said third conveyor means and supported on said fourth conveyor means in aligned relation below said top panel means, said central core means being conveyed along said fifth and sixth conveyor means and supported at said second predetermined position in aligned relation between said top and bottom panel means, such that upon releasing said vacuum means and pivoting said pivoting means said top panel means and central core means are dropped onto said bottom panel means to thereby form said honeycomb construction, and said apparatus also comprising compressing means for compressing said laminated honeycomb panel construction together to provide greater strength.

References Cited

UNITED STATES PATENTS

| | | | |
|---|---|---|---|
| 2,205,003 | 6/1940 | Walters | 156—563 XR |
| 2,731,379 | 1/1956 | Wheeler | 156—197 |
| 3,139,369 | 6/1964 | Sullivan et al. | 156—563 |
| 3,185,610 | 5/1965 | Lincoln et al. | 156—558 XR |
| 3,344,503 | 10/1967 | Merritt | 156—563 XR |

JOHN T. GOOLKASIAN, Primary Examiner

G. W. MOXON II, Assistant Examiner

U.S. Cl. X.R.

156—290, 558, 563; 214—1, 6